United States Patent [19]

Aebi et al.

[11] Patent Number: 5,368,873
[45] Date of Patent: Nov. 29, 1994

[54] PROCESS FOR PREPARING DEHYDRATED VEGETABLE PRODUCTS

[75] Inventors: Kurt J. Aebi, Cockeysville; Roman D. Grypa, North East; Thein Aung, Cockeysville; Mary J. Lee, Baltimore, all of Md.

[73] Assignee: McCormick & Company, Inc., Sparks, Md.

[21] Appl. No.: 110,680

[22] Filed: Aug. 9, 1993

Related U.S. Application Data

[63] Continuation of Ser. No. 799,145, Nov. 27, 1991, abandoned, which is a continuation-in-part of Ser. No. 630,967, Dec. 24, 1990, abandoned.

[51] Int. Cl.⁵ .............................................. A23L 1/223
[52] U.S. Cl. .................................... 426/310; 426/638; 426/303
[58] Field of Search ............ 426/102, 639, 640, 638, 426/302, 303, 310

[56] References Cited

U.S. PATENT DOCUMENTS

| | | | |
|---|---|---|---|
| 2,432,222 | 12/1947 | Zenzes | 426/640 |
| 3,556,814 | 1/1971 | Whitman | 426/310 |
| 3,801,714 | 4/1974 | Shipman | 426/310 |
| 4,361,589 | 11/1982 | Wauters | 426/639 |
| 4,447,460 | 5/1984 | Lewis | 426/640 |
| 4,777,055 | 10/1988 | Laiw | 426/310 |
| 4,832,969 | 5/1989 | Lioutas | 426/615 |
| 4,889,730 | 12/1989 | Roberts | 426/639 |
| 4,948,609 | 8/1990 | Nafisi-Movaghar | 426/639 |

FOREIGN PATENT DOCUMENTS 946330  4/1962  United Kingdom .

OTHER PUBLICATIONS

Osmotic Dehydration of Fruits by J. D. Ponting, et al.; Oct. 1966 Food Technology pp. 125–128.

*Primary Examiner*—Carolyn Paden
*Attorney, Agent, or Firm*—Oblon, Spivak, McClelland, Maier & Neustadt

[57] ABSTRACT

The present invention relates to a low moisture vegetable product in a process for producing same. The low moisture vegetable product comprises vegetable product and a solid, amorphous osmotic agent. The resulting product has extended storage life as compared with fresh vegetable products and yet may be rehydrated to produce a product having the flavor, color and taste of fresh vegetable products. The process for producing the low moisture vegetable product comprises immersing the vegetable in a liquid bath containing a osmotic agent capable of infusing into the vegetable tissue and forming an amorphous solid upon drying. Once excess osmotic agent has been removed, the infused product is dried to form a vegetable product having a water content of from about 2 to 6 percent by weight and which contains an amorphous, solid, osmotic agent.

11 Claims, 6 Drawing Sheets

PROCESS FOR PREPARING DEHYDRATED VEGETABLE PRODUCTS

RELATED APPLICATIONS

This application is a continuation of application Ser. No. 07/799,145, filed on Nov. 27, 1991 now abandoned which was a continuation-in-part of application Ser. No. 07/630 967, filed on Dec. 24, 1990, both now abandoned.

BACKGROUND OF THE INVENTION

Technical Field

The present invention generally relates to shelf-stable vegetable products which will upon rehydration exhibit the color, flavor, and overall appearance similar to that of the freshly prepared vegetables and methods for their preparation.

BACKGROUND INFORMATION

In summary, prior art endeavors in this field which have emphasized the extension of shelf-life have resorted to treatments of the fresh vegetable product which include rather severe dehydration of the product and or complex treatments of the product and in some instances the use of chemical treatments. The adverse impact of such processes on a number of characteristics of vegetable products is well known, and marketing demands for fresh appearing products have lessened interest in such techniques. In short, the prior art has long recognized a need for a simple, effective method for preserving the fresh characteristics of vegetables.

In addition many prior art dehydration procedures rely upon the use of chemical additives to achieve the desired results. U.S. Pat. No. 4,361,589 relies upon sulfites to produce a dehydrated celery product having good color. Omission of the sulfite results in a product having a straw-like color and not the characteristic green color of celery. U.S. Pat. No. 4,832,969 relies upon the combination of alkaline buffers and magnesium salts to produce a green vegetable product having the desired color. Both U.S. Pat. Nos. 4,361,589 and 4,832,969 rely upon osmotic agents to perform a portion of the dehydration and it is to the solution of osmotic agent that the chemicals are added. While the processes of both patents produce dehydrated green vegetables having good color, neither process is able to retain the flavor of vegetable upon rehydration. That is the flavor of the fresh vegetable is often lost. These processes suffer from the further defect of relying upon chemical additives to retain the vegetables color. Further, the process of U.S. Pat. No. 4,832,969 can only be used with vegetables which naturally have a green color such as broccoli because the process imparts a strong often dark unnatural green color to any vegetable which contains even a slight amount chlorophyll including onions. Thus it is unsuitable for use with vegetables such as onion, garlic, light colored vegetables such as cabbage or cauliflower since it produces a product having an unnatural color.

British Patent 946,330 suggests dehydrating foodstuffs by infusing the foodstuffs with a sugar and drying to introduce crystalline sugar into the foodstuff, see page 2, lines 60–69. No disclosure of an amorphous coating is to be found in the British patent. In addition, the use of an alkaline treatment step prior to infusion also appears to be a necessary element of the process, although, general discussion of simple sugar infusion is included in the disclosure.

The present invention provides a method for treating freshly harvested vegetables so that the important qualities thereof associated with freshness such as natural appearance, flavor, taste, and product integrity will be retained while the shelf-life of the product is appreciably extended as compared to the untreated product.

This invention is the result of an extensive investigation into how to maintain fresh flavor and appearance in shelf-stable dehydrated vegetables. The disclosed process results in superior shelf-stable dehydrated vegetables that upon rehydration have the appearance and flavor approximating that of freshly prepared products.

SUMMARY OF THE INVENTION

An object of the present invention is to provide a method of preparing and using treated fresh vegetable products so as to preserve the desirable qualities found in such fresh products while extending their useful shelf-life and the compositions thereof.

A further object of the present invention is to provide a method of preparing and using shelf stable vegetable products which will upon rehydration exhibit the color, flavor, texture and overall appearance similar to that of freshly prepared vegetable products.

Another object of this invention is to provide novel dehydrated vegetable plant products which can be readily rehydrated to provide a product having sensory properties of freshly prepared vegetables.

These and other objects of this invention which will become apparent from the following disclosure have been obtained by treating the plant material with a solution of an osmotic agent which is capable of infusion into the plant tissue and of forming a coating which is at least partially amorphous or glass-like over the plant tissue structure, upon drying of the infused product. In a further embodiment of this technique, the vegetable material is first washed in an initial liquid bath, thinly sliced, and then subjected to the infusion process followed by drying as required.

Additional objects and advantages of the present invention are apparent from the following description having reference to the following drawings.

BRIEF DESCRIPTION OF THE DRAWINGS

FIG. 4 is the color universe for cabbage, FIG. 5 for green bell peppers, FIG. 6 is for onions.

DETAILED DESCRIPTION OF THE PREFERRED EMBODIMENTS

Figure 1:
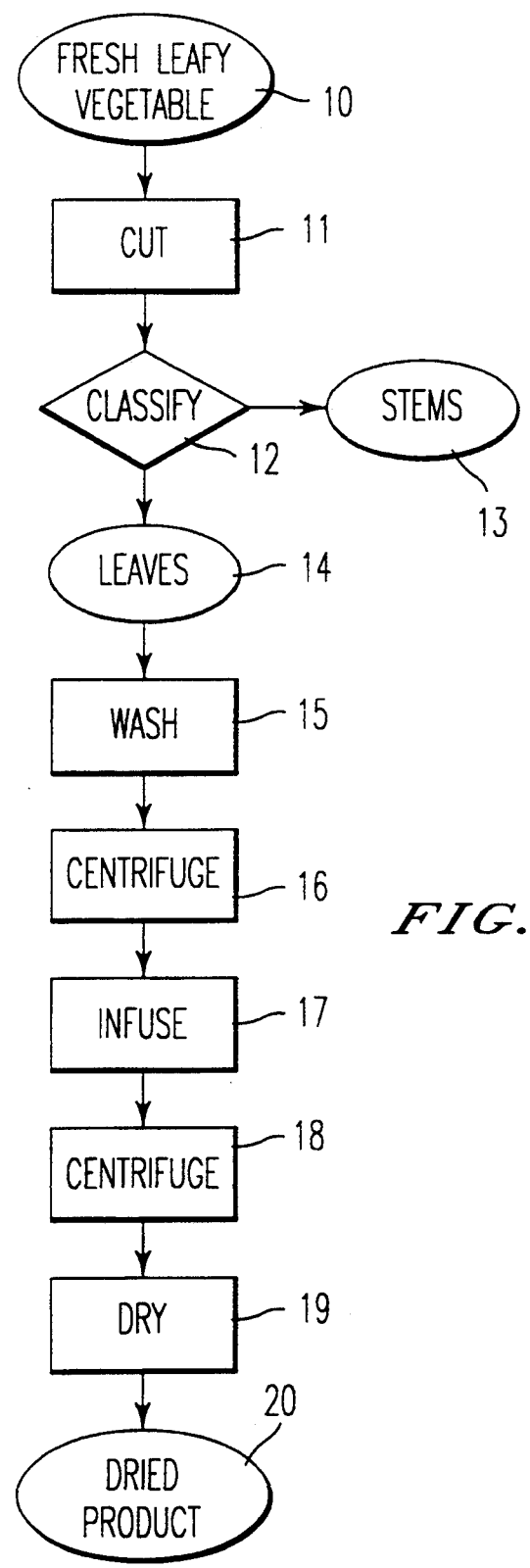
FIG. 1 is a block-type flow chart setting forth a preferred method of the present invention as applied to the treatment of leafy vegetables and for forming the product of that method.

Essentially any vegetable which can be dehydrated can be processed with the present procedure. In addition, vegetables not previously considered suitable for dehydration on a commercial scale may also be processed. The essential characteristic of vegetables which can be processed is the ability of the vegetable to be sliced, diced, shredded or otherwise reduced in size without any adverse effect on the product's texture. In the present process it is necessary to expose the interior of the vegetable by such procedures so that the osmotic agent may act to reduce the water content in a reasonable time period. Such vegetables include leafy and flowering vegetables such as cabbage, spinach, broccoli, kale, turnip greens and cauliflower; capsicums such as bell peppers, jalapeno peppers and banana peppers; bulb vegetables such as onion and garlic; and root vegetables such as potatoes and carrots. In addition although not technically a vegetable, tomatoes, especially firm, ones, can be processed in this procedure. Further, celery, squashes and turnips may also be treated in this procedure. Vegetables such as peas are not generally treated because of the difficulty of infusing the osmotic agent into peas. Corn may be treated in accordance with this process after removal from the husk if sufficient infusion time is provided. In summary, any vegetable into which the osmotic agent may be successfully infused without adversely affecting the texture of the vegetable upon rehydration may be treated. Vegetables treated by this process are prized for their appearance, texture and flavor.

The present process comprises infusing the thinly sliced vegetable with a humectant solution under conventional soaking or blanching conditions followed by drying to produce a product containing a solid, amorphous coating on the vegetable tissue. It is of primary importance that the vegetable product be thinly sliced to no greater than ¼" to facilitate infusion of the humectant solution into the vegetable. The preferred thickness range is from 1/16" to 3/16". Efficient infusion and coating of the osmotic agent into/on the vegetable is necessary to maintain fresh-like texture, color and flavor of the vegetable product. The humectants which can be used in this process are any osmotic agent, preferably food grade, which can be dried to form a non-crystalline or amorphous coating over the plant tissue. The coating may contain some crystalline portions as well. Preferred humectants also possess high water solubility, preferably sufficient solubility to form a solution containing at least 5% by weight of osmotic agent up to the maximum solubility of osmotic agent in consideration. The content of osmotic agent does not usually exceed 70%, preferably at least 20% and more preferably from 20 to 60% by weight. The solvent used to form the humectant solution need not be water but can be any solvent which is easily removed by drying and does not adversely affect the flavor and aroma components. Preferably the solvent is a food grade solvent such as water, propylene glycol, glycerine and ethanol. The preferred solvent is water. The osmotic agent preferably has a low molecular weight to create high osmotic pressure sufficient to cause moisture to migrate from the plant to the humectant solution. Suitable osmotic agents include monosaccharides, disaccharides, those polyalcohols which form solids at room temperature, corn syrups and their derivative products and mixtures thereof. Preferred osmotic agents are high fructose corn syrup (HFCS), fructose, glucose, sucrose, maltose, sorbitol, maltitol, honey, and hydrogenated corn syrup. More preferred are corn syrup having a D.E. above about 42, glucose, fructose, sucrose and or mixtures thereof. The most preferred osmotic agent is HFCS.

Upon drying, sucrose normally will not form an amorphous solid but tends to crystallize. However sucrose can be used successfully to treat vegetables in the present invention because vegetables may contain sufficient quantities of simple sugars which combine with the sucrose to form an amorphous film around the plant tissue.

The temperature conditions under which infusion with humectant solution occurs has been found to range from the freezing point of the infusion solution up to about the solution's boiling point, preferably from 45° F. to 220° F., however optimal temperature ranges vary by product. Higher soaking temperatures from 140° F. to 220° F. are suitable for certain green leafy vegetables such as spinach for stabilization of color, although acceptable product has been produced with soaking at temperatures down to 45° F. Lower soaking temperatures are generally employed for vegetables that have enzymatically generated flavor such as onion and garlic. A preferred range for these products is from 45° F. to 160° F.

The infusion time is not critical, it need only be long enough to ensure coating and infusion. Excessive infusion times which cause degradation of the vegetable should be avoided. Times on the order of a few seconds up to several hours are suitable, preferably from 20–30 seconds to about two hours.

The drying conditions are not critical but must be sufficient to reduce the water content in the finished product sufficiently to produce the amorphous film necessary to protect the vegetable product. It has been found that at a water content of about 6% or less such amorphous films are formed. Excessive drying below about 2% may be detrimental to flavor and cause texture degradation. Excessively harsh drying conditions which might adversely affect the product properties should be avoided. Conventional drying techniques such as air drying, convection drying, vacuum drying, freeze drying, solar drying and the like may be employed to achieve the desired final water content.

Prior to subjecting the plant to the infusion step, one may wash the vegetable to remove dirt, debris and other organic matter which increases the microbial content of the vegetable. Such washing may comprise spraying the plants with or immersing them in water, a water-detergent, or water-wetting agent mixture to remove such dirt, etc. If detergent or other wetting agent is used, the vegetables should be rinsed to remove residual detergent/wetting agent. Excess water from the washing step should be removed. The removal can be by simply draining, with air, vacuum, spinning or centrifuging. The preferred technique is spinning or centrifuging which quickly provides a dewatered product ready for infusion.

The product resulting from the processing steps has a long shelf-life, in some cases over one year at ambient temperatures in sealed packages. This product is characterized by having an amorphous coating of the osmotic agent substantially covering the plant tissue. The preferred product of this invention is characterized as a vegetable having an amorphous sugar coating substantially covering or encapsulating the plant tissue. In a particularly preferred aspect, the vegetable product comprises at least 40% by weight of vegetable solids with the remainder sugar and water. In a particularly preferred embodiment the product comprises less than about 6% by weight of water, and most preferably from 2-6 wt. % water.

In the sense of the present product, encapsulation of the vegetable product means that the amorphous film forms a barrier which must be crossed before flavor components of the vegetable can escape to the surrounding atmosphere.

It is not necessary that all the plant tissue be encapsulated. It is sufficient if enough plant tissue is encapsulated such that the desired flavor and color are maintained. Obviously the more complete the encapsulation, the more flavor and color are retained. However, even minimal encapsulation results in improved properties. It is preferred that the encapsulation be as complete as possible where a product which compares favorably with the fresh vegetable is desired.

The size of the vegetable pieces to be treated by the present process determines the time for infusion as well as the texture of the finished product. Thus it is desirable to reduce the vegetable to a size which facilitates infusion and gives the desired texture of the freshly prepared vegetable.

The preferred mode of the present invention comprises the steps of: (a) washing the product with a first liquid bath; (b) removing excess surface liquid of the first bath; (c) cutting the product to a size to facilitate infusion; (d) infusing the product by immersing in a second liquid bath containing a substantial quantity of an osmotic agent; (e) removing excess surface liquid of the second bath; (f) finish drying the coated and infused product.

A more preferred aspect of the present invention comprises the steps of: (a) washing the product with a first liquid bath; (b) removing excess surface liquid of the first bath; (c) cutting the product to a size to facilitate infusion; (d) infusing the product in a second liquid bath containing from about 5% to 70% of the osmotic agent solids for a time of from about 2 minutes to about 2 hours; (e) finish drying the coated and infused product in such a manner that appearance and texture are maintained and the flavor is encapsulated in situ in the finished product and the product has a preferred moisture content of from about 2% to about 6%, most preferably 4% to 5%.

As noted above, the present invention relates to a method for preparing a shelf-stable, dehydrated, coated vegetable as well as the product of such methods which upon rehydration exhibit the color, flavor, aroma and overall appearance similar to fresh or freshly blanched vegetable. Generally, the process comprises the steps of preparing the raw material by washing, dewatering, size reduction, treating the raw material with an osmotic agent, removing excess surface liquid and drying. All the percentages (%) recited in this application are "by weight" unless otherwise indicated.

Referring now to the drawing, wherein like numerals designate corresponding parts throughout the view, there is shown in FIG. 1 a flow chart illustrating the sequence of steps that may be employed in preferred aspects of the present invention.

Figure 2:
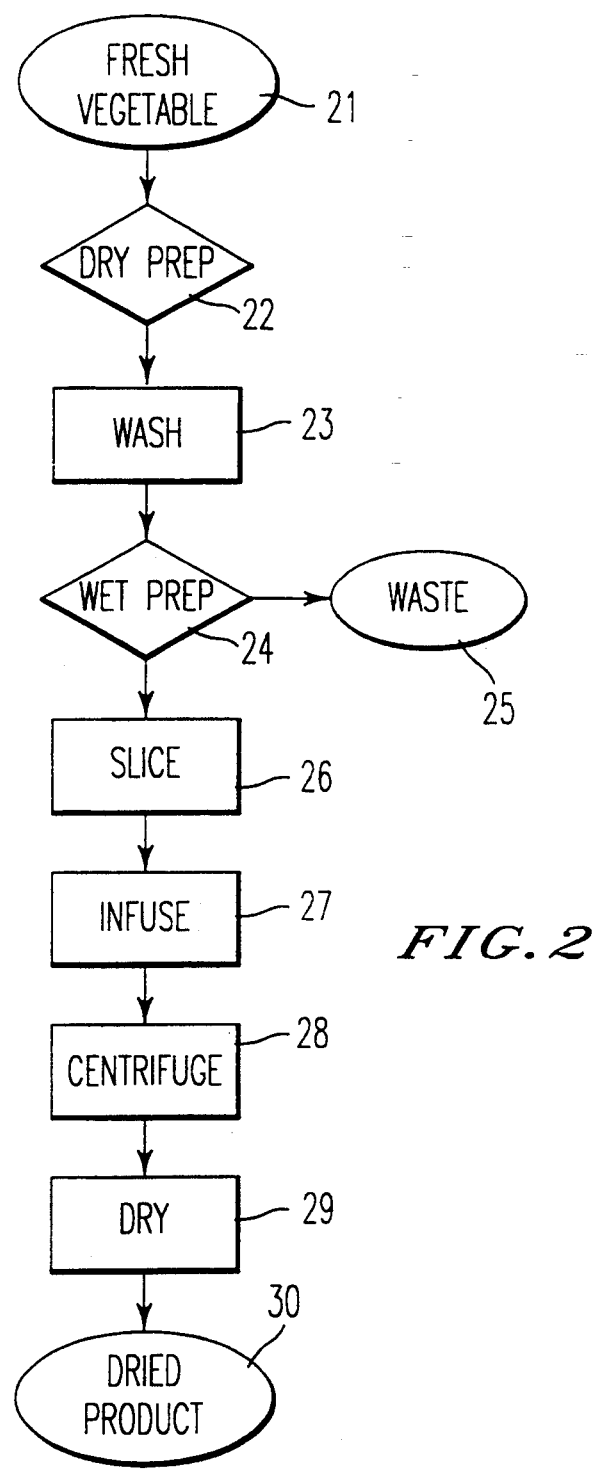
FIG. 2 is a block diagram illustrating the general processing steps for use in the process when the vegetables need to be sliced before infusion.

Although the process can be carried out in batch form, it is preferred that the process be substantially continuous so that, as is customary in production facilities, the speed of the throughput conveyors will be set to accommodate the step in the process requiring the greatest dwell time. In handling of freshly harvested vegetables, it will be appreciated by those skilled in the art that for different plants, different specific treatment parameters throughout the steps of the process may be required. While FIGS. 1 and 2 are self explanatory when read in conjunction with the following description, it will be noted that in FIGS. 1 and 2 several alternative packaging processes are available to a user of the process after the finish drying step 19, 29 with regard to packaging the dried product 20, 30. The various packaging techniques presently available can be employed and their selection will, in large part, be determined by the type of vegetable being treated as well as by the type of osmotic agent employed. For example, if a highly hygroscopic osmotic agent is employed for treating the vegetable, it will be preferred to store such a product in moisture resistant packaging.

It is an object of the present invention to enable a food processor to treat the freshly harvested products so that the treated product can be packaged conventionally and exhibit a shelf-life of from one month to over one year or longer without significant deterioration in the desirable qualities of appearance, color, flavoring capacity, aroma and overall product integrity.

Typical vegetables which can be treated include, but are not limited to cabbage, bell peppers, Jalapeno peppers, onion, garlic, carrots, radishes, horseradish, turnips, broccoli, green beans, cauliflower, potato, spinach, ginger, green pepper, corns black and green olives, asparagus, certain varieties of fresh mushrooms such as Shiitake, and genetic variations thereof. Examples of genetic variations are Tabasco peppers, Bermuda onions, Vidalia onions, elephant garlic, Swiss chard, mustard greens and so forth. A preferred group of vegetables for use in conjunction with the present invention are cabbage, onion, garlic, carrots, bell peppers and spinach.

Fresh vegetable is harvested and preferably kept cool prior to processing to prevent enzymatic degradation. In carting out the disclosed method of treatment, the freshly harvested vegetables are first processed by separating the vegetable from extraneous stems and other debris. In the case of leafy vegetables such as spinach, it is desirable to separate excess stem, roots and non-leaf portions of the plant because the extraneous matter may cause problems with drying of the product or cause additional handling concerns for removal from the finished product. This separation improves the drying rate of the damp product as well as improving the quality of the finished product through more even drying. Therefore it is desirable in a preferred method to separate out the non-leaf portions. This may be accomplished by any acceptable manner known to those skilled in the art. For example, gentle strip-cutting 11 of the whole fresh vegetable leaf into pieces ranging in size from one-quarter to one inch may be carried out using an Urschel cutter, although it is certainly contemplated that if desirable, whole leaves could be processed. Any means of separation of the leaves from non-leaf material can be used, however a more efficient method would be to use an air classifier 12 which separates the leaves from the more dense stems which are discarded 13. To some extent, effective leaf/stem separation is dependent upon obtaining fresh raw material (not wilted) that is free from surface water. The stem-free product 14 is then ready to be washed 15.

Again any means that are effective for removing field dirt, sand, pesticides and also reduces the microbial load may be employed. In the preferred continuous process, the stem free product is taken from the above supply located upstream of a conveyor which at its discharge end drops the vegetable product into a washer equipped with a bank of spray nozzles to agitate and wet the leaves. The nozzles are preferably fed with chilled water at approximately 40° F. from any acceptable feeding means. The leaves are conveyed via paddles through the washer where the leaves are thoroughly washed. The washing station may employ a deep tank for submerging the product for treatment instead of just spraying or a combination of spraying and submersion may be used. Preferably the product is immersed in a bath containing an ambient temperature or a slightly chilled food-grade detergent solution. The detergent solution is circulated through the bath as well as sprayed from the above-mentioned nozzles at the top of the bath at high velocity for agitation of the leaves.

The washed leaves are then conveyed on a vibrating conveyor and sprayed with ambient potable water to rinse away the detergent. Excess surface water is then removed from the leaves using any conventional means. Such means will be familiar to those skilled in the art and include a variety of methods such as vibration over a screen, and/or vacuum aspiration, pressing, or by use of high powered jets of air. However, a preferred method is by centrifugation 16. The leaves are loaded manually into a centrifuge basket and then the centrifuge is accelerated up to a maximum of 350 G for approximately 2 minutes. This method removes greater than 90% of the surface water with minimum damage to the leaves.

Initial preparation of head vegetables such as cabbage would be processed similarly to leafy vegetables, however in contrast to the leafy vegetables, waste material removal from and washing of the head vegetables would occur prior to slicing/cutting. Separation of non-leaf material from the cabbage head may be done by any acceptable means. Due to the thickness of the leaf of head vegetables, it is imperative that the leaves must be sliced to a thickness from 1/16" to ¼" to facilitate infusion into the vegetable tissue. A more preferable range would be from ⅛ to 3/16". The slicing 26 can be carried out manually or by the use of such devices as an automatic meat slicer or an Urschel cutter.

Pod vegetables such as peppers and green beans, bulb vegetables such as garlic and onion, and root vegetables such as carrots and radishes are processed similarly to head vegetables in that following removal of non-vegetable material 22 and washing/removal 23, 24, 25 of the outer surface of the vegetable, the vegetable is sliced to a thickness from 1/16" to ¼" 26. Again, a more preferable range would be from ⅛" to 3/16".

The next step in the treatment of the vegetable is infusing 17, 27 of the cleaned, dried vegetable in a hypertonic solution which substantially coats, infuses into and osmotically dehydrates the vegetable product. Although the osmotic agent may be added to the vegetable by various known means, a recycling loop/procedure for reusing the osmotic agent is possible. This procedure may be preferred for treating the vegetables. Recycling of the osmotic agent not only has economical benefits, but also may result in superior flavor and color in the final product. In particular, some of the desirable flavor and color of the fresh vegetable that may be removed during this step are recycled back into the product by reusing the osmotic solution. Thus, the flavor and color of the final product may be further enhanced. In products where infusion occurs at low temperatures, the soaking solution may be rapidly pasteurized prior to reuse to reduce microbial contamination.

By hypertonic solution, it is meant a solution that has sufficient osmotic pressure such that moisture migrates from the vegetable to the bath solution. Furthermore, by coating or encapsulating, we mean an osmotic agent which upon finish drying will form a substantially continuous amorphous or glass-like film on the treated product.

The osmotic agent used must be able to infuse the vegetable being treated. Osmotic agents used in the hypertonic infusing or blanching solutions can be chosen from a group of organic materials which have high water solubility and are of sufficiently low molecular weight to create high osmotic pressure discussed previously. The most preferable agents for this purpose are HFCS, glucose, sucrose and/or mixtures thereof. some degree the choice of the osmotic agent depends on its cost and commercial availability.

Organic materials which do not have sufficient solubility or have a large molecular weight do not facilitate osmotic dehydration and are not singly usable for this process, however it is anticipated that they may be used as a secondary coating or component of the coating to aid in handling the product during subsequent processing and/or to provide additional texture improvements the osmotically dehydrated vegetable. Examples of these compounds are carbohydrates, polyalcohols and proteins such as starch, maltodextrin, gum Arabic and gelatin. The osmotic agent also must be able to form a solid amorphous structure upon drying to entrain or encapsulate the flavor components in a solid matrix. Therefore, osmotic agents such as glycerol and propylene glycol cannot be used for this process as the osmotic agent although one may be present as a solvent. Inorganic salts such as sodium chloride and calcium chloride, while having excellent osmotic dehydration properties, do not encapsulate the flavor components in a non-crystalline matrix in the dried product leading to rapid flavor loss upon dehydration. Therefore such osmotic agents cannot be used alone for this process. However, it is contemplated that osmotic agents which dry to an amorphous solid may if desired be used in combination with other osmotic agents and as a mixture may be effective herein.

Although it is possible to use a broad range of osmotic agent solids in the present invention, in order to achieve acceptable finished product quality, the infusing/blanching solution should preferably contain at least 5% dissolved osmotic agent solids and may contain up to the maximum amount of osmotic agent solids which can be effectively utilized. For example, for commercially available HFCS the maximum amount of dissolved solids is up to about 70%. A more preferred range is from about 20% to 60%. The most preferable solids concentration in the infusion solution is from about 20% to 40%. When the osmotic solution is recycled, its concentration can be restored to the desired level by adding high concentration sugar syrup or dry sugar to the recycled solution.

Osmotic dehydration selectively removes the water from the vegetable while concentrating and retaining the flavor components. This is in contrast to conventional drying by heated moving air which volatilizes not only the water but much of the volatile flavor of the vegetable. Osmotic dehydration is directly related to the concentration of the dissolved particles, therefore increasing the concentration of the osmotic agent improves flavor retention and decreases the moisture content of the infused vegetable. However, viscosity of the sugar solution increases with concentration, therefore removal of excess syrup from the infused vegetable becomes more difficult which can result in severe stickiness and clumping problems during subsequent air drying.

The infusing temperature may vary from about 40° F. to about 220° F. The preferred temperature range varies by vegetable class and generally is inversely related to soak time. Green leafy vegetables such as spinach can be blanched at temperatures up to 220° F for one to two minutes, however acceptable spinach product can also be made by infusing the spinach at 40° F. for two hours. The preferred temperature range for leafy vegetables is anticipated to be 140° F. to 200° F. The preferred infusing temperature range for root vegetables and for bulb vegetables is 40° F. to 160° F. for optimal retention of fresh texture and flavor of these vegetable products. The flavor of bulb vegetables such as onion and garlic is enzymatically generated and high infusion temperatures will destroy the fresh flavor of these products.

The amount of time that the material is infused will vary by type of product and by the thickness of that product. The present invention contemplates a time that is effective in dehydrating and infusing the vegetable product. A preferred infusing time should be at least 1.5 minutes at 200° F. and may be up to 2 hours or longer if lower temperatures and thicker slices of vegetable product are utilized. A more preferred range for spinach would be from about two minutes to five minutes at 200° F. A more preferred range for onion would be from about 10 minutes to 30 minutes at 68° F.

The pH of the infusion solution is not critical and is determined by the osmotic agent. If the osmotic agent is a saccharide, the pH will naturally range from about 4.5 to 7. If desired the pH may be adjusted with a food grade acid or base such as hydrochloric acid or sodium hydroxide. However, the use of buffers should be avoided. pH adjustment is not necessary nor desirable to achieve the results obtained by the present process but may be used if necessary to control solution viscosity or the like.

If the finished product upon rehydration exhibits excessive sweetness conventional bittering agents may be added either to the infusion solution or added subsequently to the infused product. Such bittering agents are described in U.S. Pat. No. 4,244,976 at columns 2 and 3. Generally, however, the flavor of the rehydrated vegetables is excellent without the use of bittering agents.

If desired salt may be added to the infusion solution. However, the use of salt has not exhibited any improvement in product properties over products produced without the use of salt. It is also possible to incorporate antioxidants such as BHT, TBHQ and/or tocopherols to improve shelf life. The antioxidant may incorporated into the infusion solution or added to the infused product prior to drying.

The ratio of soaking solution to vegetable should be at least eight to one (wt:wt) to adequately coat and infuse into the vegetable product. A higher ratio of soaking solution:vegetable may be required if the temperature of the soaking solution must be maintained during soaking/infusion into the vegetable. Following infusion, excess surface blanching solution is removed from the infused vegetable by means such as gravitational draining, centrifugation, pressing or other available methods which do not damage the leaf structure. Equipment and procedures similar to those used for the previous dewatering steps could be used. The force used needs to be sufficient to remove most of the surface syrup solution but not so excessive as to damage the vegetables or to compact the vegetables into clumps which cannot be easily broken up prior to drying. Minor clumping can be eliminated by gently shaking the product prior to loading on the dryer. The product, partially dehydrated by osmotic agents, is finish dried by conventional dehydration which may include air drying, vacuum drying, freeze drying, and the like. One preferred method which has been found to be economical is by conventional air drying. Excellent product has been produced using either a constant drying temperature or by conventional step-down drying profiles from 200° F. down to 130° F. over the drying period. Utilizing standard drying profiles shortens the drying time of the product compared to the prior art ('589 and '969) and greatly improves the commercialization of the vegetable products. Air velocity in the dryer is not greater than 200 feet/minute. Optimal drying profiles vary by product class and thickness. A preferable constant drying temperature range is from 135° F. to 160° F. A more preferable constant drying range is from 145° F. to 155° F. A preferable stepdown drying profile for vegetables is from 220° F. to 110° F. A more preferable stepdown drying profile is from 200° F. to 130° F. The final moisture content of the dry product should be between about 2% and 6%. The product has to be sufficiently dry so that crystallization of the coating material is prevented, or with non-crystallizing coating, that the coating material must be sufficiently continuous to prevent flavor loss. For vegetable products a preferred moisture range is from about 2% to about 6%, more preferably would be from about 4% to about 6% and most preferably 4% to about 5%.

The final products of the present invention are low moisture products which are different from the intermediate moisture products such as those prepared in accordance with the process of U.S. Pat. No. 4,832,969. The water activity of the products of this invention ranges from about 0.2 to about 0.4, while for the prior art intermediate water content products the $A_w$ ranges from 0.3 to 0.85.

Vegetables prepared by the method disclosed in the present invention may contain a broad range of osmotic agent concentrations. Depending on the particular vegetable being treated it has been found that the osmotic agent content may vary from about 20% to about 70% with a preferred range from about 35% to about 65% and a most preferred range from about 40% to about 45%.

As a result of treatment, the moisture content of the vegetable product will be further reduced so that the resulting water activity ($A_w$) of the preferred product, as that term is defined in UK Pat. No. 2,014,429 A, will be on the range of from about 0.2 to about 0.4.

Microscopic examination of the finished product confirmed that sugars have infused into the vegetable tissue as well as substantially coated the vegetable surface. The product retains its characteristic fresh color and flavor for at least six months at ambient storage in a sealed container. Upon rehydration, color, flavor, texture and overall appearance are very similar to freshly prepared vegetables. Sweetness contributed by the osmotic agents was not objectionable as determined by sensory evaluation and is an advantage in certain cases in recipe applications.

Although how the preservation method of the present invention works is not completely understood, it is believed that many of the undesirable flavor notes in vegetables are due to lipid oxidation. Thus, it is believed that the present invention may be effective to some extent by limiting oxygen exposure through coating and infusion of the product (*Concentration and Drying of Foods*. D. McCarthy, Ed., pp. 31–51. Elsevier, London, 1986).

The unique fresh/freshly blanched flavor, texture and appearance of the rehydrated vegetable product enable it to be used successfully as a direct replacement for freshly prepared vegetables. In contrast, conventional air dried vegetables do not resume a fresh appearance or texture upon rehydration and cannot be used in place of fresh produce. It is further contemplated that product made by the method of the present invention could be used in a variety of food applications, including but not limited to snacks, condiments or components for use with other food items such as soups, sauces, salads, baked goods and so forth.

The present vegetable products differ from those treated by prior techniques in that fresh appearance, flavor and texture are maintained in a dehydrated state with minimal prior treatment. The prior art has not been able to achieve the level of quality obtained in this invention without resorting to the use of food additives such as sulfites ('589) or various other chemical additives ('969); or by using extremely low drying temperatures which result in excessive drying times; or by utilizing specialized packaging and/or flushing with nitrogen gas to prevent transmission of light and oxygen.

The Hunter Color Difference Meter is a well known color measuring device that is used extensively in the food industry as well as other industries such as textile, paint and automotive where color measurement is critical. Color differences were measured analytically using the Hunter LabScan Color Difference Meter (Reston, Va.). The instrument measures the color of the vegetable pieces and gives values using the familiar Hunter L, a, b, three dimensional color scale. Generally the "L" scale ranges from zero to one hundred with zero being black and one hundred being pure white. The "a" scale similarly measures the red-green continuum while the "b" scale measures the blue-to-yellow scale. Measurements for each scale are made on two axes and the values are averaged to give a mean measurement. As a general guideline, a difference in the L,a,b value(s) of 0.5–1.0 is considered just noticeable to the human eye; a difference of 2−3 is slight and a difference of >4 is considerable. Thus, every vegetable will have a particular spatial point in the Hunter three-dimensional color universe designated by specific coordinates with respect to each of these axes. The data presented are using the Cie-lab scale which is more representative of the perception by the human eye and is denoted in the tables by having an asterisk following the letter (e.g. L*,a*,b*).

Having now generally described this invention, a further understanding can be obtained by reference to certain specific examples which are provided herein for purposes of illustration only and are not intended to be limiting unless otherwise specified.

EXAMPLE 1

A shelf stable dehydrated onion with fresh-like quality characteristics was prepared in accordance with the method described below.

Fresh onions (Creole variety, 18% solids) were cored, peeled and sliced into ⅜" rings (1000 g sliced fresh onion). The sliced onions were soaked in a 40% sucrose solution (wt/wt) at a 2:1 ratio syrup:onion for 30 minutes at 68° F. The onions were drained for 1 minute and excess syrup was removed by centrifugation at 900 RPM for 2 minutes (Bock Model FP605, Toledo, Ohio). The infused onion slices were then dried in a pilot scale dryer (Proctor and Schwartz Model 062, Horsham, Pa.) with alternating air direction and a conventional step-down drying profile starting at 200° F., and finishing at 130° F. over a period of five hours. The final product weighed 245 g and had the following composition:

| Onion solids | 69.3 |
|---|---|
| Sucrose | 26.0 |
| Moisture | 4.7 |

Upon rehydration the infused onions had the characteristic white color and texture of a freshly cut onion. The rehydrated product exhibited pungency, heat and flavor similar in character to fresh onion. Onions from the same lot dried under conventional commercial dehydration conditions were slightly gray-brown in appearance and had a tough texture. The flavor character of the air-dried product was typical of dehydrated onions with predominantly bitter, metallic and cardboard off-notes. The flavor of the infused onion slices was judged by a sensory evaluation panel to be superior to air-dried onion.

The shelf-life of the infused dried product is anticipated to be at least one year at room temperature in sealed containers.

EXAMPLE 2

Approximately 100 pounds of whole spinach leaves were washed in ambient temperature water containing 2500 ppm Vega-kleen detergent (Klenzade, Division of Ecolab, Inc., St. Paul, Minn.) to remove field dirt and to reduce microbial load. The washed leaves were rinsed with clean ambient temperature water to remove residual detergent. The remaining surface water was removed by centrifugation (Bock centrifuge, Model FP605); the leaves were then blanched in a hypertonic solution containing 20° Brix high fructose corn syrup (HFCS, Isosweet 100, 42% fructose, 50–52% dextrose on a dry solids basis, A. E. Staley Manufacturing Company, Decatur, Ill.) at 200° for 2 minutes. The excess osmotic solution was removed by centrifugation (Bock Model FP605) at 500 RPM for 1 minute. The infused spinach leaves were then dried for 2 hours at 150° F. in a pilot scale vibrating fluidized bed dryer (Carrier, Inc., Louisville, Ky.) with up-through air (flow rate about 100 feet per minute) without vibration. The final product weighed 14 pounds (6356 g) and had a composition of:

| Spinach solids | 62.9% |
|---|---|
| Glucose | 16.6% |
| Fructose | 14.8% |
| Other Sugars | 2.4% |
| moisture | 4.0% |

Upon rehydration, the spinach leaves have an appearance, texture and flavor approximating that of freshly blanched spinach. The infused dehydrated product has a shelf life of greater than one year at room temperature in sealed containers.

EXAMPLE 3

Fresh green bell peppers were cored, seeded and sliced into ⅛" strips on a delicatessen style meat slicer (Univex Model #7510, Salem, N.H.). The sliced peppers (1000 g) were soaked at 68° F. for 30 minutes in a 35° Brix HFCS (Isosweet 100, Staley Industrial Products, Decatur, Ill.). The pepper slices were drained for 1 minute and excess syrup was removed via centrifugation (Bock Model FP605, Toledo, Ohio) at 900 RPM for two minutes.

The infused pepper slices were then dried in a pilot scale dryer (Proctor and Schwartz Model 062, Horsham, Pa.) with alternating air direction and a conventional step-down drying profile starting at 200° F. and finishing at 130° F. over a period of five hours.

Upon rehydration, the texture, appearance and flavor closely approximated that of freshly prepared bell pepper slices. It is anticipated the dehydrated product has a shelf life greater than one year at ambient temperature.

EXAMPLE 4

Fresh spinach leaves were rinsed to remove surface dirt and then centrifuged (Bock Model FP605) to remove excess surface moisture. The spinach leaves (1000 g) were then immersed in a 20% sucrose solution at 40° F. for 30 minutes. The spinach leaves were drained for 1 minute and excess syrup was removed by centrifugation at 900 RPM for 2 minutes (Bock Model FP605, Toledo, Ohio). The infused spinach leaves were then dried in a pilot scale dryer (Proctor and Schwartz Model 062, Horsham, Pa.) with alternating air direction and a conventional step-down drying profile starting at 200° F. and finishing at 130° F. over a period of five hours.

Upon rehydration the infused spinach leaves had the characteristic green color, texture and flavor of a freshly blanched spinach. The flavor character of the air-dried product was typical of dehydrated spinach with predominantly bitter, metallic and cardboard off-notes.

EXAMPLE 5

Fresh carrots were washed, peeled and were cut into 3/16"square by 1" julienne strips on a food processor (Hallde Food Processor Model RG-7). The sliced carrots were infused at 160° F. for 20 minutes in a 20 Brix HFCS solution. The carrots were drained for 1 minute and then centrifuged for 2 minutes using a kitchen salad spinner to remove excess infusing solution. The infused carrot slices were dried using a lab scale dryer beginning at 185° F. and finishing at 150° F. over a four hour period.

Upon rehydration the infused carrot slices had characteristic bright orange color and crisp texture of freshly sliced carrots. Commercially dehydrated carrots had a faded orange appearance, a tough texture and oxidized off-notes. The flavor of the infused carrots were vastly superior to the air-dried product.

The shelf-life of the infused product is anticipated to be at least one year at room temperature in sealed containers.

EXAMPLE 6

Fresh green bell peppers were cored, seeded and sliced into ⅛" strips on a delicatessen style meat slicer (Univex Model #7510, Salem, N.H.). The sliced peppers (1000 g) were soaked at 68° F. for 30 minutes in a 40% sucrose solution. The pepper slices were drained for 1 minute and excess syrup was removed via centrifugation (Bock Model FP605, Toledo, Ohio) at 900 RPM for two minutes.

The infused pepper slices were then dried in a pilot scale dryer (Proctor and Schwartz Model 062, Horsham, Pa.) with alternating air direction and a conventional step-down drying profile starting at 200° F. and finishing at 130° F. over a period of six hours (This sample will be referred to as Sample 13B). A second bell pepper sample (referred to as sample 10) was prepared using different conditions. The bell pepper strips were soaked in a solution of 60% 42 DE (Dextrose Equivalent) corn syrup (A. E. Staley Corporation, Decatur, IL) containing 2.5% salt (sodium chloride). The pH of the solution was adjusted to 8.5 prior to soaking the peppers. Sample 10 was dried identically to sample 13B. For comparison, bell pepper samples were prepared in accordance to Example 1, U.S. Pat. No. 4,361,589 ('589) and also in accordance to Example 1, U.S. Pat. No. 4,832,969 ('969). In addition, commercially available dehydrated products were obtained: CVC ⅜"×1" N/T, (California Vegetable Concentrates, Kraft Food Ingredients, P.O. Box 3659, Modesto, Calif. 95352), Cade-Grayson #113-38 (Cade-Grayson Co., 2445 Cades Way, Vista, Calif. 92083), and Sunspiced #912-4 (Basic Vegetable Products, P.O. Box 599, Vacaville, Calif. 95696) for evaluation. All laboratory samples were prepared over a period of two weeks prior to evaluation.

The samples were rehydrated under recommended conditions and were presented to an trained/experienced sensory evaluation panel of 11 people for evaluation. The panelists rated the samples for overall acceptability using a five point hedonic scale. Mean scores were generated and the data were analyzed for statistically significant differences ($p<0.05$, SAS, Statistical Analysis Systems, Cary, N.C.). Means were separated using the Duncan's Multiple Range test. Statistically different means are followed by different superscript letters.

| Sample | Sensory Score |
| --- | --- |
| Sample 13B | 3.2[a] |
| '589 | 3.0[a] |
| Sample 10 | 2.0[b] |
| '969 | 1.4[c] |
| CVC | 1.3[c] |
| Cade-Grayson | 1.1[c] |
| Sunspiced | 1.0[c] |

These data indicate that the overall acceptability of sample 13B is statistically equivalent to the sample produced by the '589 patent and superior to the other samples evaluated. Sample 10 was judged superior in overall quality to the sample prepared by the '969 patent and the commercially available air dried samples.

EXAMPLE 7

Onion slices (⅛" thick) were prepared using identical conditions as for green bell peppers outlined in Example 6 (Sample 13B). A second onion sample (referred to as Sample 6) was prepared using different conditions: the onion slices were soaked in a 20% sucrose solution at 68° F. for 10 minutes and subsequently dried at a constant 145° F. for six hours. For comparison, onion samples were prepared using conditions outlined in Example 1, U.S. Pat. No. 4,361,589 ('589) and using conditions outlined in Example 1, U.S. Pat. No. 4,832,969 ('969). In addition, commercially available air-dehydrated products were obtained: (Gilroy Foods Inc., 1350 Pacheco Pass Road, Gilroy, Calif. 95021) and Crisp Fresh (Gilroy Foods Inc., 1350 Pacheco Pass Road, Gilroy, Calif. 95021) for evaluation. All laboratory samples were prepared over a period of two weeks prior to evaluation.

The samples were rehydrated under recommended conditions and were presented to an trained/experienced sensory evaluation panel of 11 people for evaluation. The panelists rated the samples for overall acceptability using a five point hedonic scale. Mean scores were generated and the data were analyzed for statistically significant differences ($p < 0.05$, SAS, Statistical Analysis Systems, Cary, N.C.). Means were separated using the Duncan's Multiple Range test. Statistically different means are followed by different superscript letters.

| Sample | Sensory Score |
| --- | --- |
| Sample 13B | 4.0[a] |
| Sample 6 | 3.6[a] |
| '589 | 2.5[b] |
| Gilroy | 2.1[b] |
| '969 | 1.9[b,c] |
| Crisp Fresh | 1.2[c] |

These data indicate that samples 13B and 6 are statistically superior in overall acceptability to the other samples evaluated.

EXAMPLE 8

Fresh cabbage was rinsed with ambient temperature water and sliced into $\frac{3}{8}''$ slices using a delicatessen meat slicer (Univex Model 7510, Salem, N.H.). The cabbage slices were soaked in a 60% sucrose solution at 160° F. for 60 minutes. The pH of the soaking solution was adjusted to 8.5 with sodium hydroxide prior to soaking the cabbage. Following soaking, the cabbage was drained and centrifuged (Bock Model FP605, Toledo, Ohio) to remove excess soaking solution. The infused cabbage was dried in a pilot scale dryer (Proctor and Schwartz Model 062, Horsham, Pa.) with alternating air direction and a conventional step-down drying profile starting at 160° F. and finishing at 140° F. over a period of nine hours (This sample will be referred to as Sample 9). For comparison, cabbage samples were prepared using conditions outlined in Example 1, U.S. Pat. No. 4,361,589 ('589) and using conditions outlined in Example 1, U.S. Pat. No. 4,832,969 ('969). In addition, commercially available air-dried products were obtained for comparison: CVC $\frac{3}{8}''$ NS 21 507, (California Vegetable Concentrates, Kraft Food Ingredients, P.O. Box 3659, Modesto, Calif. 95353), Cade-Grayson #107-S (Cade-Grayson Co., 2445 Cades Way, Vista, Calif. 92083). Also, commercially available freeze-dried cabbage (Oregon Freeze-Dry, Inc., P.O. Box 1048, Albany, Oreg. 97321) was compared. All laboratory samples were prepared over a period of two weeks prior to evaluation. The samples were rehydrated under recommended conditions and were presented to an trained/experienced sensory evaluation panel of 11 people for evaluation. The panelists rated the samples for overall acceptability using a five point hedonic scale. Mean scores were generated and the data were analyzed for statistically significant differences ($p < 0.05$, SAS, Statistical Analysis Systems, Durham, N.C.). Means were separated using the Duncan's Multiple Range test. Statistically different means are followed by different superscript letters.

| Sample | Sensory Score |
| --- | --- |
| Sample 9 | 3.1[a] |
| '589 | 2.9[a] |
| '969 | 1.7[b] |
| CVC | 1.5[b] |
| Freeze Dried | 1.3[b] |
| Cade-Grayson | 1.3[b] |

These data indicate that the overall acceptability of sample 9 is statistically equivalent to the sample produced by the '589 patent and superior to the other samples evaluated.

EXAMPLE 9

Fresh spinach leaves were rinsed to remove surface dirt and then centrifuged (Bock Model FP605) to remove excess surface moisture. The spinach leaves were then immersed in a 20% HFCS solution at 200° F. for 2 minutes. The spinach leaves were drained for 1 minute and excess syrup was removed by centrifugation at 900 RPM for 2 minutes (Bock Model FP605, Toledo, Ohio). The infused spinach leaves (Referred to as Sample 1) were then dried in a pilot scale dryer (Proctor and Schwartz Model 062, Horsham, Pa.) with alternating air direction and a conventional step-down drying profile starting at 200° F. and finishing at 130° F. over a period of five hours. A second spinach sample (referred to as Sample 5) was prepared using different conditions: the spinach leaves were soaked in a 40% 42 DE corn syrup solution at 200° F. for 2 minutes and subsequently dried under identical conditions to Sample 1. For comparison, spinach samples were prepared using conditions outlined in Example 3, U.S. Pat. No. 4,361,589 ('589) and using conditions outlined in Example 1, U.S. Pat. No. 4,832,969 ('969). In addition, commercially available air-dehydrated product was obtained (Cade-Grayson #145-NF, Cade-Grayson Co., 2445 Cades Way, Vista, Calif. 92083) for evaluation. All laboratory samples were prepared over a period of two weeks prior to evaluation.

The samples were rehydrated under recommended conditions and were presented to an trained/experienced sensory evaluation panel of 11 people for evaluation. The panelists rated the samples for overall acceptability using a five point hedonic scale. Mean scores were generated and the data were analyzed for statistically significant differences ($p < 0.05$, SAS, Statistical Analysis Systems, Durham, N.C.). Means were separated using the Duncan's Multiple Range test. Statistically different means are followed by different superscript letters.

| Sample | Sensory Score |
| --- | --- |
| '589 | 3.4[a] |
| '969 | 2.5[b] |
| Sample 1 | 2.4[b] |
| Sample 5 | 1.7[b,c] |
| Cade-Grayson | 1.5[c] |

These data indicate that the overall acceptability of sample 1 and sample 5 is statistically equivalent to the sample produced by the '969 patent and superior to the air-dried sample evaluated. The sample prepared by the teaching of the '589 was superior to all other samples evaluated.

EXAMPLE 10

This example demonstrates the effects of varying processing conditions on the composition and quality of dehydrated cabbage products, as measured by instrumental and by sensory evaluation. A Plackett-Burmam experimental design was used for this experiment and order of preparation was randomized to eliminate experimental bias. Fresh cabbage was cut into ⅛" slices using a Univex Model 7510 meat slicer for each sample prepared using the conditions outlined in Table 1. Approximately 6000 g sliced cabbage was used for each sample. The ratio of soaking solution to cabbage was 2.5:1. The drying conditions for the Proctor and Schwartz dryer (Model 062, Horsham, Pa.) are presented in Table 2. In addition, cabbage was prepared using the conditions outlined in Example 1 of U.S. Pat. No. 4,361,589 and also in Example 1 of U.S. Pat. No. 4,832,969. Commercially prepared (Cade-Grayson #107-S, Cade-Grayson Co., 2445 Cades Way, Vista, Calif. 92083) and lab prepared air dried cabbage was also included in the test. Analytical data on finished cabbage product are presented in Table 3. Water activity ($A_w$) was determined using a Decagon Model CX-2 (Decagon Devices, Inc., Pullman, Wash.). Moisture was determined using a Computrac Max 50 Moisture Analyzer (Arizona Instrument, Tempe, Ariz.). Product pH was determined by measuring the pH of a 1% solution using an Orion Model 520 pH Meter (Orion Research, Inc.). Percent reducing sugars was determined by extraction of a 1% solution in water by a modified Association of Official Analytical Method. Percent chloride was determined by potentiometric titration (Buchler 4-2500 digital chloridometer, VWR Scientific) of a 1% solution in water. Moisture content of the product was approximately 5% and water activity was approximately 0.3. The pH of a 1% solution was approximately 6.1. The data show no consistent effect of processing conditions on water activity, moisture content or product pH. Percent chloride concentration was directly related to the concentrations of salts in the soaking solution.

Color measurements were determined on both dry, ground and rehydrated cabbage (Table 4) using the Hunter LabScan Color Difference Meter (Reston, Va.). Cabbage used for dry ground measurements was ground with a coffee mill and passed through a 20 mesh screen. Color measurements were also made on rehydrated cabbage which had been soaked in ambient temperature water for 30 minutes and then drained of excess water prior to measurement.

The samples were analyzed by an expert sensory evaluation panel. All samples were rehydrated in room temperature spring water at a 6:1 water:cabbage ratio; the samples were rehydrated for 30 minutes. The serving size of each sample to each panelist was approximately 1 tablespoon which was placed in a 4 oz styrofoam cup and covered with a watchglass. The liquid was drained prior to serving the samples. Panelists were instructed to rinse their mouths with spring water and eat a small portion of unsalted top cracker before starting their evaluation and between each sample. Panelists were instructed to evaluate flavor (regardless of additives such as sugar and/or salt), texture, appearance and overall quality. The panel was composed of 15 expert panelists who were trained to quantitatively discern differences in flavor, texture, color and overall quality in vegetables. All samples were presented simultaneously for evaluation. The samples were scored by marking a 15 cm line representing the intensity of the characteristic being evaluated. The data are presented in Table 5. The study was conducted using a balanced incomplete block design and the data were analyzed by analysis of variance.

Analysis of variance of the sensory data for the first 12 trials (Table 5) by processing factor (Table 6) separated the effect of each process condition and determined which factors were statistically significant in this experiment. The data suggest that soaking temperature has the greatest impact on all the measured sensory attributes followed by sugar type. The remaining factors had little effect on the sensory characteristics of the products. Sugar concentration had a significant effect on the texture of the cabbage products. Sugar taupe had a significant effect on all attributes except appearance. Soaking time, salt and pH had no significant effect on any of the attributes.

Cabbage prepared by conditions outlined in Trial 9 (Table 1) was compared against commercial air dried and R&D air dried cabbage (Table 7). The cabbage prepared by the new process scored significantly higher in quality attributes (flavor, texture, appearance and quality) than the commercial air-dried sample and also higher than laboratory prepared air-dried cabbage. Cabbage prepared by the new process also was significantly higher in quality attributes compared to cabbage prepared by the '589 and '969 process (Table 8).

The color data for rehydrated samples (Table 4) are plotted in a three dimensional "color universe" (FIG. 4) to illustrate the color grouping of cabbage samples. Samples that were judged acceptable (overall quality score ≧6, Tables 5,7 and 8) are designated with an asterisk. The numbers correspond to the trial number; AD corresponds to commercial air dried cabbage; 589 corresponds to Example 1, U.S. Pat. No. 4,361,589 and 969 corresponds to Example 1, U.S. Pat. No. 4,832,969.

Figure 4:
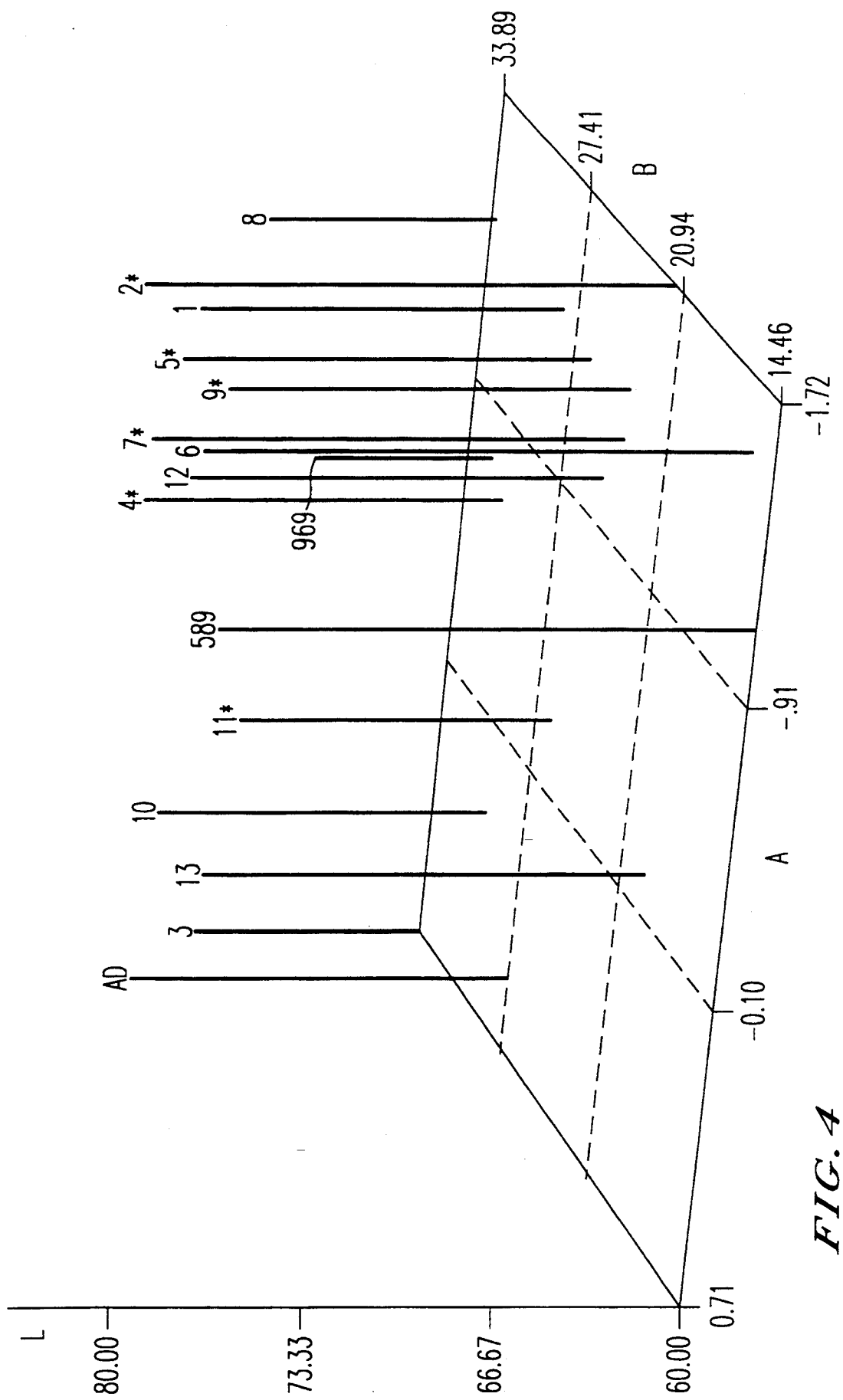
FIGS. 4–6 are three-dimensional graphs representing the color universe for various vegetable types when treated in accordance with the present technique and compared with prior art procedures.

Samples from trials 5, 7 and 9 were judged acceptable in overall quality and are closely grouped by color (FIG. 4). These three samples were processed using the same osmotic agent concentration and temperature of 60% sucrose and 160° F. Samples from the other acceptable trials which were not as closely grouped in color were sample 2 (20% sucrose and 160° F.); sample 4 (60% sucrose, 68° F.); and sample 11 (20% sucrose, 160° F.).

TABLE 1

Soaking Solution Conditions for Cabbage

| Trial Number | Order of Prep. | Sugar Conc. (%) | Sugar Type | Soak Temp °F. | Soak Time minutes | pH | Salt Conc. (%) |
|---|---|---|---|---|---|---|---|
| 1 | 9 | 20 | C.S.S.* | 68 | 60 | 4.5 | 2.5 |
| 2 | 8 | 20 | Sucrose | 160 | 10 | 8.5 | 2.5 |
| 3 | 7 | 20 | Sucrose | 68 | 60 | 8.5 | 0 |
| 4 | 6 | 60 | Sucrose | 68 | 10 | 4.5 | 2.5 |
| 5 | 4 | 60 | C.S.S. | 160 | 10 | 4.5 | 0 |
| 6 | 12 | 20 | Sucrose | 68 | 10 | 4.5 | 0 |
| 7 | 2 | 60 | Sucrose | 160 | 60 | 4.5 | 2.5 |
| 8 | 5 | 60 | C.S.S. | 68 | 10 | 8.5 | 0 |
| 9 | 10 | 60 | Sucrose | 160 | 60 | 8.5 | 0 |
| 10 | 1 | 60 | C.S.S. | 68 | 60 | 8.5 | 2.5 |
| 11 | 3 | 20 | C.S.S. | 160 | 60 | 4.5 | 0 |
| 12 | 11 | 20 | C.S.S. | 160 | 10 | 8.5 | 2.5 |

TABLE 1-continued

Soaking Solution Conditions for Cabbage

| Trial Number | Order of Prep. | Sugar Conc. (%) | Sugar Type | Soak Temp °F. | Soak Time minutes | pH | Salt Conc. (%) |
|---|---|---|---|---|---|---|---|
| 13 | 13 | 40 | Sucrose | 68 | 30 | | |

*C.S.S. = dry 42 D.E. corn syrup solids

TABLE 2

Proctor and Schwartz Dryer Conditions

| Dryer Stage | Temperature (°F.) | Time (minutes) | Air Direction |
|---|---|---|---|
| A1 | 160 | 15 | UP |
| A2 | 150 | 15 | DOWN |
| A3 | 145 | 30 | UP |
| A4 | 140 | 30 | DOWN |
| A/B | FLUFF | | |
| B1 | 135 | 60 | DOWN |
| B2 | 135 | 60 | DOWN |
| B/C | FLUFF | | |
| C1 | 130 | 60 | DOWN |
| C2 | 130 | 60 | DOWN |

TABLE 3

Analytical Data on Cabbage Samples.

| Trial Number | Sugar Type | $A_w$ | Moisture (%) | pH | Reducing Sugar (%) | Chloride (%) |
|---|---|---|---|---|---|---|
| 1 | C.S.S. | 0.275 | 5.52 | 6.0 | | 4 |
| 2 | Sucrose | 0.293 | 4.97 | 6.4 | 54 | 8 |
| 3 | Sucrose | 0.247 | 4.78 | 5.9 | 20 | <1.8 |
| 4 | Sucrose | 0.313 | 2.99 | 6.0 | 38 | 4 |
| 5 | C.S.S. | 0.322 | 4.95 | 6.0 | | <1.6 |
| 6 | Sucrose | 0.238 | 6.08 | 6.0 | 18 | 3 |
| 7 | Sucrose | 0.281 | 3.27 | 6.1 | 72 | <1.8 |
| 8 | C.S.S. | 0.279 | 4.51 | 6.0 | 76 | <1.6 |
| 9 | Sucrose | 0.387 | 2.41 | 6.2 | | <1.8 |
| 10 | C.S.S. | 0.285 | 5.02 | 6.0 | | 3 |
| 11 | C.S.S. | 0.373 | 4.10 | 5.9 | | <1.7 |
| 12 | C.S.S. | 0.290 | 4.79 | 6.1 | | 10 |
| 13 | Sucrose | 0.340 | 3.28 | 5.9 | 31 | <1.8 |
| | '589 | 0.380 | 3.2 | 7.3 | 10 | <1.7 |
| | '969 | 0.210 | 6.6 | 6.8 | 10 | 7.3 |
| | COMM. A/D | 0.370 | 5.67 | | 0 | <1.7 |
| | R&D A/D | 0.230 | 3.45 | | 3 | <1.7 |

TABLE 4

Hunter Color Difference Measurements on Dry, Ground and Rehydrated Cabbage.

| Trial Number | Sugar Type | Dry, Ground L* | Dry, Ground a* | Dry, Ground b* | Rehydrated L* | Rehydrated a* | Rehydrated b* |
|---|---|---|---|---|---|---|---|
| 1 | C.S.S. | 70.57 | −1.11 | 32.08 | 72.77 | −1.33 | 28.45 |
| 2 | Sucrose | 74.54 | −0.11 | 32.67 | 78.65 | −1.72 | 21.29 |
| 3 | Sucrose | 69.53 | 2.04 | 32.94 | 68.50 | 0.71 | 33.89 |
| 4 | Sucrose | 72.99 | 1.3 | 33.55 | 73.20 | −0.68 | 31.12 |
| 5 | C.S.S. | 73.07 | 0.74 | 31.64 | 74.70 | −1.29 | 26.43 |
| 6 | Sucrose | 70.32 | 0.63 | 30.21 | 71.09 | −0.81 | 31.62 |
| 7 | Sucrose | 75.55 | −0.21 | 29.73 | 76.65 | −1.19 | 23.71 |
| 8 | C.S.S. | 69.26 | 1.09 | 33.84 | 68.39 | −1.36 | 33.66 |
| 9 | Sucrose | 76.82 | 0.94 | 27.45 | 74.33 | −1.33 | 23.69 |
| 10 | C.S.S. | 68.23 | 1.35 | 33.47 | 72.29 | 0.16 | 30.09 |
| 11 | C.S.S. | 73.94 | 1.35 | 30.97 | 71.00 | −0.28 | 26.43 |
| 12 | C.S.S. | 73.64 | 0.34 | 31.16 | 74.64 | −1.04 | 24.74 |
| 13 | Sucrose | 70.22 | −6.79 | 26.47 | 75.47 | −0.20 | 19.58 |
| | '589 | 75.81 | −3.26 | 26.61 | 78.39 | −1.12 | 14.46 |
| | '969 | 70.22 | −6.79 | 26.74 | 74.71 | −1.53 | 15.85 |
| | COM A/D | 74.01 | −3.26 | 26.61 | 74.09 | 0.50 | 27.34 |
| | R&D A/D | 76.27 | −1.1 | 27.15 | | | |

TABLE 5

Sensory scores for cabbage.

| Trial # | Flavor | Texture | Appearance | Quality |
|---|---|---|---|---|
| 1 | 4.4 | 4.4 | 5.3 | 4.2 |
| 2 | 6.9 | 5.4 | 9.3 | 7.2 |
| 3 | 5.1 | 3.7 | 2.4 | 3.8 |
| 4 | 6.5 | 5.3 | 4.3 | 6.4 |
| 5 | 7.3 | 5.6 | 6.3 | 7.1 |
| 6 | 5.3 | 3.1 | 2.1 | 3.4 |
| 7 | 7.3 | 7.2 | 6.3 | 7.3 |
| 8 | 4.9 | 3.9 | 3.6 | 3.7 |
| 9 | 8.8 | 8.9 | 9.5 | 9.4 |
| 10 | 2.2 | 1.9 | 1.8 | 1.6 |
| 11 | 7.2 | 6.3 | 6.3 | 7.0 |
| 12 | 6.1 | 5.6 | 6.2 | 5.5 |

TABLE 6

Analysis of variance by processing factor. Only statistically significant results are presented as probability values.

| | Flavor-no additives | Texture | Appearance | Quality |
|---|---|---|---|---|
| Sugar Conc. | | 0.0490 | | |
| Sugar Type | 0.0067 | 0.0138 | | 0.0001 |
| Soak Temp | 0.0001 | 0.0001 | 0.0001 | 0.0001 |
| Soak Time | | | | |
| Salt | | | | |
| pH | | | | |

TABLE 7

Evaluation of New Process Cabbage vs commercial Air Dried vs R&D Air Dried cabbage.

| | p > F (all trials included) | Trial #9 | Commercial Air Dried[1] | R&D Air Dried |
|---|---|---|---|---|
| Flavor-no additives | 0.0300 | 7.8$^a$ | 2.3$^b$ | 4.8$^{ab}$ |
| Texture | 0.0001 | 8.7$^a$ | 1.8$^c$ | 5.3$^b$ |
| Appearance | 0.0001 | 7.8$^a$ | 0.6$^b$ | 4.7$^{ab}$ |
| Quality | 0.0001 | 7.6$^a$ | 1.2$^b$ | 4.1$^{ab}$ |

[1]Commercially air dried cabbage from Cade-Grayson.
Values followed by different superscript letters are significantly different ($P < 0.05$)

TABLE 8

Results of analysis of variance comparing New Process cabbage vs Example 1 of '589 and '969 patents.

| | p > F | Trial #9 | Eq. 1, '589 | Eq. 1, '969 |
|---|---|---|---|---|
| Flavor-no additives | 0.0242 | 8.1$^a$ | 5.2$^{ab}$ | 3.7$^b$ |
| Texture | 0.0015 | 8.0$^a$ | 4.1$^b$ | 2.7$^c$ |
| Appearance | 0.0128 | 9.1$^a$ | 4.8$^b$ | 5.2$^b$ |
| Quality | 0.0157 | 7.7$^a$ | 5.1$^b$ | 4.2$^b$ |

Values followed by different superscript letters are significantly different ($P < 0.05$)

EXAMPLE 11

Green bell peppers were prepared and evaluated as described in Table 9. Analytical data (Table 10) show a lack of correlation between processing variables and finished product water activity, moisture content and pH. Chloride content is a function of the concentration of the salts in the soaking solution. Color measurements were determined on both dry, ground and rehydrated green bell peppers (Table 1) using the Hunter LabScan Color Difference Meter (Reston, Va.), as outlined in Example 10.

Sensory analysis was performed as outlined in example 10 and sensory scores for the first 12 trials are presented in Table 12. Analysis of variance of the sensory data by processing factor (Table 13) established which factors were statistically different in this experiment. The results suggest that soaking temperature has the greatest impact on sensory attributes measured; a low soaking temperature must be maintained for improved quality. A low sugar concentration slightly improved the texture and appearance of the products. Sugar type had no significant effect on any of the measured attributes. Longer soaking times adversely affected appearance. Salt significantly affected the overall difference of the samples; a low salt concentration is preferable. A high soaking solution pH significantly improved flavor, appearance and quality.

Green bell pepper prepared by conditions outlined in Trial 13 (Table 9) was compared against commercial air dried and R&D air dried green bell pepper (Table 14). The green bell peppers prepared by the new process scored significantly higher in quality attributes (flavor, texture, appearance and quality) than the commercial air-dried sample and similar to R&D air dried product. Green bell pepper prepared by the new process also was significantly higher in quality attributes compared to pepper prepared by the '589 and '969 process except in appearance (Table 15).

Figure 5:
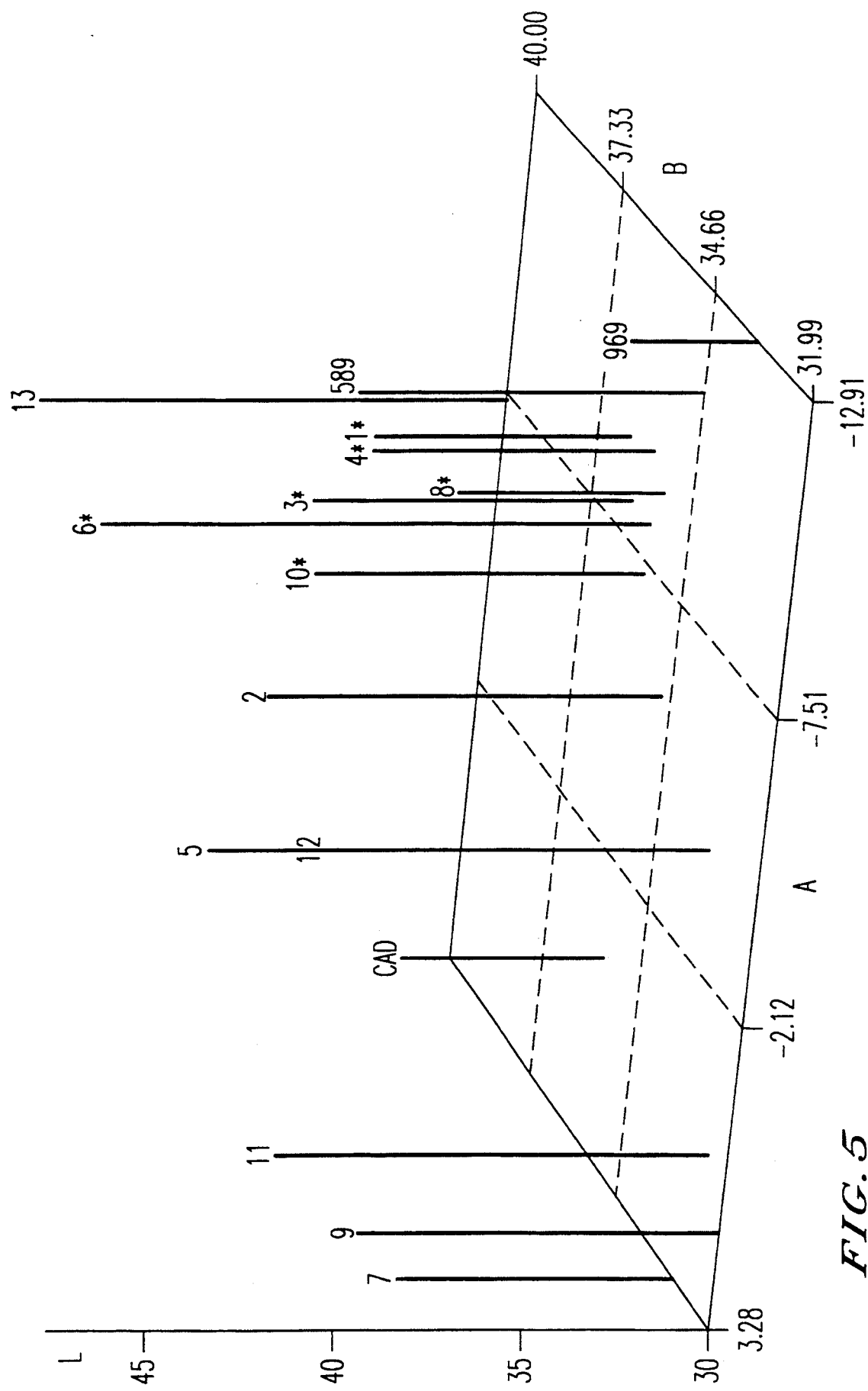

The color data for rehydrated samples (Table 11) are plotted in a three dimensional "color universe" (FIG. 5) to illustrate the grouping of acceptable green bell pepper samples. Samples that were judged acceptable (overall quality score $\geq 6$, Tables 12, 14, and 15) are designated with an asterisk. The numbers correspond to the trial number; CAD corresponds to commercial air dried green bell pepper; 589 corresponds to Example 1, U.S. Pat. No. 4,361,589 and 969 corresponds to Example 1, U.S. Pat. No. 4,832,969.

Samples from trials 1, 3, 4, 6, 8 and 10 grouped together and were judged acceptable in overall quality. All the acceptable samples were processed using a 68° F. soak temperature. No other factor appeared critical in making an acceptable product.

TABLE 9

Soaking Solution Conditions for Green Bell Pepper

| Trial Number | Order of Prep. | Sugar Conc. (%) | Sugar Type | Soak Temp °F. | Soak Time minutes | pH | Salt Conc. (%) |
|---|---|---|---|---|---|---|---|
| 1 | 9 | 20 | C.S.S.* | 68 | 60 | 4.5 | 2.5 |
| 2 | 8 | 20 | Sucrose | 160 | 10 | 8.5 | 2.5 |
| 3 | 7 | 20 | Sucrose | 68 | 60 | 8.5 | 0 |
| 4 | 6 | 60 | Sucrose | 68 | 10 | 4.5 | 2.5 |
| 5 | 4 | 60 | C.S.S. | 160 | 10 | 4.5 | 0 |
| 6 | 12 | 20 | Sucrose | 68 | 10 | 4.5 | 0 |
| 7 | 2 | 60 | Sucrose | 160 | 60 | 4.5 | 2.5 |
| 8 | 5 | 60 | C.S.S. | 68 | 10 | 8.5 | 0 |
| 9 | 10 | 60 | Sucrose | 160 | 60 | 8.5 | 0 |
| 10 | 1 | 60 | C.S.S. | 68 | 60 | 8.5 | 2.5 |
| 11 | 3 | 20 | C.S.S. | 160 | 60 | 4.5 | 0 |
| 12 | 11 | 20 | C.S.S. | 160 | 10 | 8.5 | 2.5 |
| 13 | 13 | 40 | Sucrose | 68 | 30 | | |

*C.S.S. = dry 42 D.E. corn syrup solids

TABLE 10

Analytical data on Green Bell Pepper Samples.

| Trial Number | Sugar Type | $A_w$ | Moisture (%) | pH | Red. Sugar (%) | Chloride (%) |
|---|---|---|---|---|---|---|
| 1 | C.S.S. | 0.30 | 4.36 | 5.5 | 5 | <1.8 |
| 2 | Sucrose | 0.30 | 2.75 | | | |
| 3 | Sucrose | 0.31 | 4.44 | 5.6 | 59 | 9.1 |
| 4 | Sucrose | 0.31 | 3.15 | 5.5 | 35 | <1.8 |
| 5 | C.S.S. | 0.35 | 2.6 | 5.8 | 38 | 3.5 |
| 6 | Sucrose | 0.23 | 2.6 | | | |
| 7 | Sucrose | 0.35 | 3.54 | 5.5 | 22 | <1.8 |
| 8 | C.S.S. | 0.29 | 4.32 | 5.6 | 74 | 3.1 |
| 9 | Sucrose | 0.41 | 2.46 | | | |
| 10 | C.S.S. | 0.29 | 2.83 | 5.9 | 83 | <1.8 |
| 11 | C.S.S. | 0.32 | 1.85 | | | |
| 12 | C.S.S. | 0.29 | 1.98 | | | |
| 13 | Sucrose | 0.34 | 3.13 | | 52 | |
| '589 | | 0.42 | 2.40 | 7.6 | 28 | 5.3 |
| '969 | | 0.24 | 5.48 | 6.5 | 30 | 1.7 |
| Com. A/D | | 0.18 | 3.16 | 5.5 | | <1.8 |

TABLE 11

Hunter Color Difference Measurements on Dry, Ground and Rehydrated Green Bell Peppers.

| Trial Number | Sugar Type | Dry, Ground | | | Rehydrated | | |
|---|---|---|---|---|---|---|---|
| | | L* | a* | b* | L* | a* | b* |
| 1 | C.S.S. | 64.92 | −8.53 | 30.88 | 36.95 | −9.10 | 36.49 |
| 2 | Sucrose | 48.98 | −7.42 | 27.95 | 40.66 | −5.66 | 34.92 |
| 3 | Sucrose | 53.87 | −4.64 | 30.57 | 38.73 | −8.16 | 36.24 |
| 4 | Sucrose | 55.08 | −7.61 | 30.83 | 37.67 | −9.40 | 35.77 |
| 5 | C.S.S. | 53.80 | −7.78 | 29.84 | 41.12 | −2.18 | 35.80 |
| 6 | Sucrose | 50.98 | −1.93 | 30.04 | 44.99 | −8.14 | 35.71 |
| 7 | Sucrose | 61.25 | −8.64 | 31.30 | 37.33 | 3.28 | 33.09 |
| 8 | C.S.S. | 47.55 | 2.72 | 28.96 | 35.47 | −8.93 | 35.41 |
| 9 | Sucrose | 50.44 | −7.21 | 28.28 | 39.57 | 1.43 | 31.99 |
| 10 | C.S.S. | 47.83 | 1.77 | 30.48 | 39.06 | −7.26 | 35.68 |
| 11 | C.S.S. | 47.25 | −6.79 | 29.31 | 41.75 | 0.46 | 32.48 |
| 12 | C.S.S. | 50.15 | 2.00 | 29.15 | 40.36 | −4.26 | 33.33 |
| 13 | Sucrose | 56.68 | −3.75 | 30.52 | 43.34 | −7.22 | 40.00 |
| Com. A/D | | 52.90 | −7.47 | 31.33 | 35.60 | −0.22 | 35.75 |
| '589 | | 45.0 | −4.0 | 28.28 | 39.29 | −11.28 | 34.62 |
| '969 | | 32.9 | −6.0 | 21.22 | 33.18 | −12.91 | 33.6 |

TABLE 12

Sensory scores for green bell pepper.

| Trial # | Flavor | Texture | Appearance | Quality |
|---|---|---|---|---|
| 1 | 7.3 | 7.1 | 6.7 | 7.0 |
| 2 | 5.7 | 5.9 | 4.2 | 5.2 |
| 3 | 9.9 | 9.0 | 8.4 | 9.5 |
| 4 | 8.5 | 7.9 | 7.4 | 8.0 |
| 5 | 5.2 | 6.2 | 2.5 | 3.9 |
| 6 | 6.7 | 6.9 | 7.4 | 7.0 |
| 7 | 2.6 | 3.4 | 0.7 | 2.2 |
| 8 | 7.0 | 6.9 | 8.1 | 7.3 |
| 9 | 3.7 | 4.8 | 1.4 | 2.9 |
| 10 | 8.7 | 7.3 | 7.9 | 8.3 |
| 11 | 2.5 | 5.9 | 1.0 | 2.5 |
| 12 | 4.3 | 5.9 | 3.6 | 4.3 |

TABLE 13

Analysis of variance by processing factor. Only statistically significant results are presented as probability values.

| Condition | Flavor | Texture | Appearance | Quality |
|---|---|---|---|---|
| Sugar conc. | | | 0.0009 | |
| Sugar type | | | | |
| Soak temp | 0.0001 | 0.0001 | 0.0001 | 0.0001 |
| Soak time | | 0.0001 | | |
| Salt | | | | |
| pH | 0.0139 | | 0.0001 | 0.0001 |

TABLE 14

Evaluation of new process green bell peppers vs commercial air dried and R&D air dried green bell pepper.

| Sensory Attribute | p > F | Trial #13 | Commercial Air Dried | R&D Air Dried |
|---|---|---|---|---|
| Flavor | 0.0001 | 8.6$^a$ | 1.3$^b$ | 8.1$^a$ |
| Texture | 0.0001 | 8.0$^a$ | 1.5$^b$ | 6.4$^a$ |
| Appearance | 0.0001 | 9.3$^a$ | 1.7$^b$ | 8.6$^a$ |
| Quality | 0.0001 | 8.9$^a$ | 1.2$^b$ | 7.7$^a$ |

TABLE 15

Analysis of variance comparing new process green bell peppers against patent examples

| Sensory Attribute | p > F | Trial #13 | '589 Eq. 1 | '969 Eq. 1 |
|---|---|---|---|---|
| Flavor | 0.0001 | 9.6$^a$ | 4.4$^b$ | 3.2$^b$ |
| Texture | 0.0001 | 9.6$^a$ | 6.3$^b$ | 1.7$^c$ |
| Appearance | 0.2556 | 8.4$^a$ | 9.7$^a$ | 8.3$^a$ |
| Quality | 0.0001 | 9.4$^a$ | 5.1$^b$ | 2.9$^c$ |

EXAMPLE 12

Onions were prepared and evaluated utilizing a Plackett-Burnham experimental design. Processing factors evaluated were sugar concentration, sugar type, soaking temperature, soaking time, drying temperature and salt concentration (Table 16). The drying temperature was actually different drying processes (Table 17). The low temperature drying profile started at 145° F. and finished at 135° F. The high temperature drying profile started at 200° F. and stepped down ultimately to 130° F. R & D Air Dried Sample was prepared according to the high temperature profile. In addition, onion was prepared using the conditions outlined in Example 1 of U.S. Pat. No. 4,361,589 and also in Example 1 of U.S. Pat. No. 4,832,969. Commercially prepared (Gilroy Foods, Inc., Gilroy, Calif.) and lab prepared air dried onion was also included in the test.

Analytical data (Table 18) show a lack of correlation between processing variables and finished product water activity, moisture content and pH. Color measurements were determined (Table 19) as outlined in Example 10.

Sensory analysis was performed as outlined in Example 10 and the data are presented in Table 20. Analysis of variance of the sensory data by processing factor (Table 21) established which factors were statistically different in this experiment. The results suggest that soaking temperature has the greatest impact on sensory attributes measured; a low soaking temperature must be maintained for improved quality. Sugar and salt concentration were next most significant; both should be low for higher quality. Sucrose gave improved appearance over corn syrup solids. Drying temperature had no effect on the quality of the product.

Onion prepared by the new process (Trial 13) scored significantly higher in all quality attributes when compared against product made using the process outlined in Example 1 of the '589 process or product made by the process outlined in Example 1 of the '969 process (Table 22).

Figure 6:
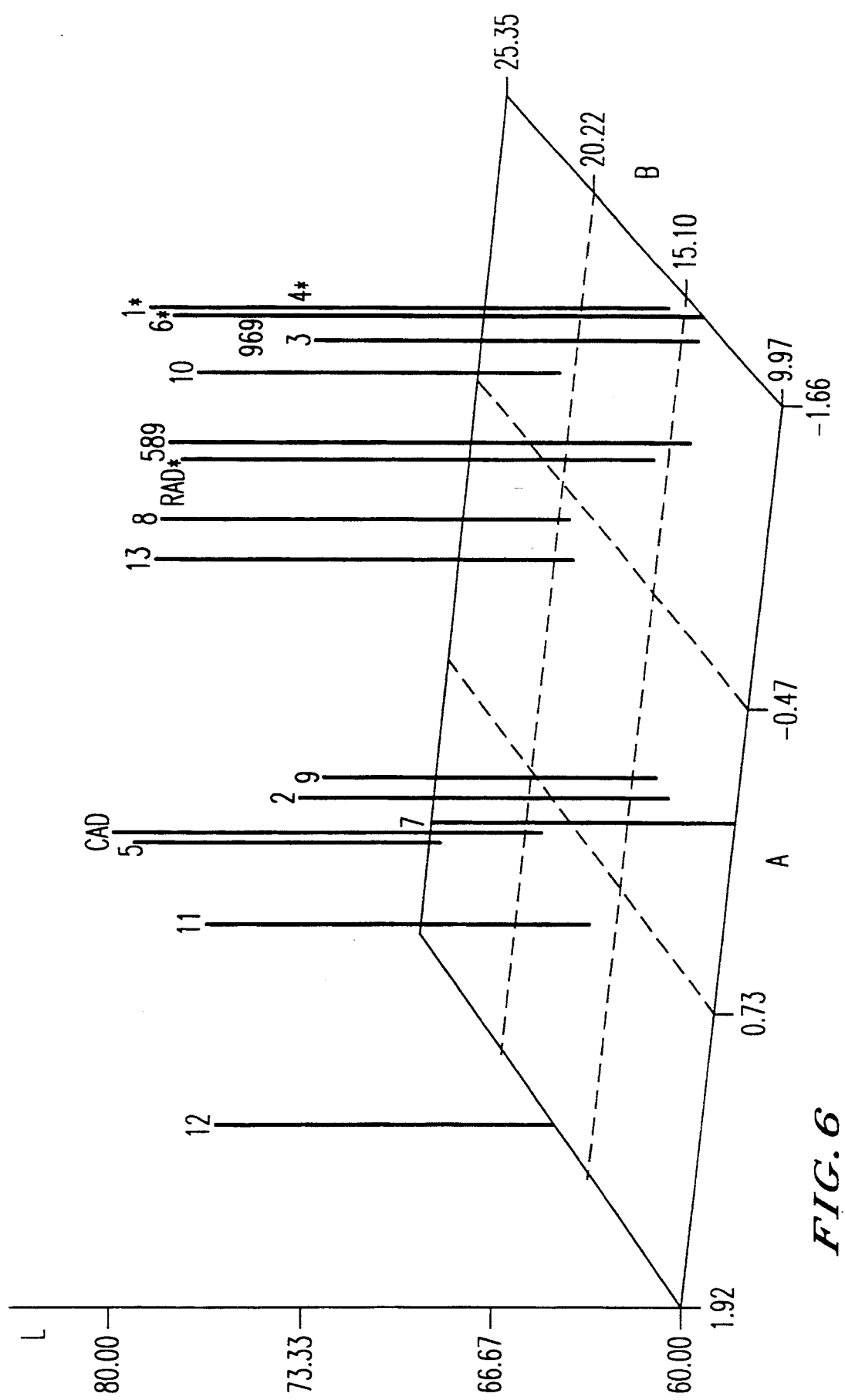

The color data for rehydrated samples (Table 19) are plotted in a three dimensional "color universe" (FIG. 6) to demonstrate the grouping of acceptable onion samples. Samples that were judged acceptable (overall quality score $\geq 6$, Tables 18, 20, and 21) are designated with an asterisk. The numbers correspond to the trial number; CAD corresponds to commercial air dried onion and RAD corresponds to R&D air dried onion; 589 corresponds to Example 1, U.S. Pat. No. 4,361,589 and 969 corresponds to Example 1, U.S. Pat. No. 4,832,969.

Samples from trials 1, 4 and 6 were judged acceptable and grouped together based on color. The common factor among these samples was a low soak temperature. The only other sample which was judged acceptable was R&D air dried.

TABLE 16

| | | Soaking Solution Conditions for Onion | | | | | |
|---|---|---|---|---|---|---|---|
| Trial Number | Order of Prep. | Sugar Conc. (%) | Sugar Type | Soak Temp °F. | Soak Time minutes | Drying Temp °F.$^1$ | Salt Conc. (%) |
| 1 | 9 | 20 | C.S.S.$^2$ | 68 | 60 | 200 | 5 |
| 2 | 8 | 20 | Sucrose | 160 | 10 | 200 | 5 |
| 3 | 7 | 20 | Sucrose | 68 | 60 | 145 | 0 |
| 4 | 6 | 60 | Sucrose | 68 | 10 | 200 | 5 |
| 5 | 4 | 60 | C.S.S. | 160 | 10 | 145 | 0 |
| 6 | 12 | 20 | Sucrose | 68 | 10 | 145 | 0 |
| 7 | 2 | 60 | Sucrose | 160 | 60 | 200 | 5 |
| 8 | 5 | 60 | C.S.S. | 68 | 10 | 145 | 0 |
| 9 | 10 | 60 | Sucrose | 160 | 60 | 145 | 0 |
| 10 | 1 | 60 | C.S.S. | 68 | 60 | 200 | 5 |
| 11 | 3 | 20 | C.S.S. | 160 | 60 | 145 | 0 |
| 12 | 11 | 20 | C.S.S. | 160 | 10 | 200 | 5 |
| 13 | 13 | 40 | Sucrose | 68 | 30 | 200 | |

$^1$Drying profile outlined in Table 2.
$^2$C.S.S. = dry 42 D.E. corn syrup solids

TABLE 17

Proctor and Schwartz Dryer Conditions. Drying temp of 200° F. as listed in Table 1 is step down as listed below; Drying temp of 145° F. as listed in Table 1 is 145° F. for first 3 hours, 135° F. for remaining 2 hours.

| Dryer Stage | Temperature (°F.) | Time (minutes) | Air Direction |
|---|---|---|---|
| A1 | 200 | 15 | UP |
| A2 | 190 | 15 | DOWN |
| A3 | 180 | 30 | UP |
| A4 | 170 | 30 | DOWN |
| A/B | FLUFF | | |
| B1 | 150 | 60 | DOWN |
| B2 | 140 | 60 | DOWN |
| B/C | FLUFF | | |
| C1 | 130 | 60 | DOWN |
| C2 | 130 | 60 | DOWN |

TABLE 18

Analytical data on Onion Samples.

| Trial Number | Sugar Type | $A_w$ | Moisture (%) | pH | Reducing Sugar (%) | Chloride (%) |
|---|---|---|---|---|---|---|
| 1 | C.S.S. | 0.34 | 3.1 | 6.1 | 4.3 | <1.8 |
| 2 | Sucrose | 0.33 | 1.4 | 6.0 | 26.2 | 9.9 |
| 3 | Sucrose | 0.39 | 3.8 | 6.2 | 14.3 | 4.7 |
| 4 | Sucrose | 0.38 | 3.5 | 6.2 | 22.1 | <1.8 |
| 5 | C.S.S. | 0.31 | 3.5 | 6.1 |  | <1.8 |
| 6 | Sucrose | 0.37 | 4.8 | 5.9 | 7.1 | <1.8 |
| 7 | Sucrose | 0.35 | 2.2 | 6.1 | 56.1 | 5.4 |
| 8 | C.S.S. | 0.40 | 5.0 | 6.2 | 4.1 | 3.1 |
| 9 | Sucrose | 0.37 | 2.8 | 6.0 | 55.8 | 5.5 |
| 10 | C.S.S. | 0.40 | 3.0 | 6.1 |  | 4.4 |
| 11 | C.S.S. | 0.43 | 4.3 | 6.0 |  | <1.8 |
| 12 | C.S.S. | 0.34 | 2.1 | 6.0 |  | 9.4 |
| 13 | Sucrose | 0.36 | 2.4 | 5.9 | 23.9 | <1.8 |
|  | '589 | 0.24 | 3.6 | 7.3 | 20 | 7.3 |
|  | '969 | 0.45 | 4.9 | 6.8 | 7 | 1.7 |
|  | Com. A/D R&D A/D | 0.49 | 7.1 | 6.0 | 4.3 | <1.8 |

TABLE 19

Hunter Color Difference Measurements on Dry, Ground and Rehydrated Onion

| Trial Number | Sugar Type | Dry, Ground | | | Rehydrated | | |
|---|---|---|---|---|---|---|---|
|  |  | L* | a* | b* | L* | a* | b* |
| 1 | C.S.S. | 89.39 | 0.47 | 13.43 | 77.50 | −1.41 | 17.34 |
| 2 | Sucrose | 85.96 | 2.06 | 14.63 | 73.05 | 0.22 | 13.56 |
| 3 | Sucrose | 89.13 | 0.20 | 14.83 | 73.29 | −1.52 | 14.52 |
| 4 | Sucrose | 88.97 | 0.69 | 15.08 | 73.96 | −1.66 | 14.11 |
| 5 | C.S.S. | 87.75 | 2.01 | 16.54 | 71.52 | 1.51 | 25.35 |
| 6 | Sucrose | 92.46 | −0.39 | 10.03 | 76.83 | −1.43 | 16.89 |
| 7 | Sucrose | 79.40 | 3.44 | 19.46 | 70.70 | −0.03 | 9.97 |
| 8 | C.S.S. | 87.55 | 0.97 | 15.44 | 74.70 | −0.32 | 20.11 |
| 9 | Sucrose | 82.93 | 2.30 | 15.62 | 71.70 | 0.19 | 14.21 |
| 10 | C.S.S. | 86.18 | 1.45 | 18.12 | 73.26 | −0.83 | 21.27 |
| 11 | C.S.S. | 85.34 | 2.70 | 14.36 | 73.82 | 1.03 | 16.74 |
| 12 | C.S.S. | 84.52 | 3.66 | 16.52 | 72.62 | 1.92 | 17.14 |
| 13 | Sucrose | 88.53 | 0.90 | 14.70 | 74.98 | −0.20 | 19.58 |
|  | '589 | 79.87 | 0.4 | 22.44 | 78.39 | −1.12 | 14.46 |
|  | '969 | 67.34 | 1.35 | 30.09 | 74.71 | −1.53 | 15.85 |
|  | Com. A/D |  |  |  | 75.79 | 0.93 | 19.59 |
|  | R&D A/D | 86.06 | 0.99 | 17.51 | 76.62 | −0.91 | 16.12 |

TABLE 20

Sensory evaluation scores for the first 12 trials (conditions outlined in Table 1).

| Trial # | Flavor | Texture | Appearance | Quality |
|---|---|---|---|---|
| 1 | 7.4 | 7.2 | 8.2 | 8.3 |
| 2 | 3.8 | 6.9 | 8.3 | 4.8 |
| 3 | 4.3 | 5.9 | 7.2 | 5.9 |
| 4 | 6.0 | 6.7 | 6.7 | 7.3 |
| 5 | 3.6 | 4.6 | 2.4 | 2.8 |
| 6 | 9.3 | 9.3 | 7.9 | 9.2 |
| 7 | 2.5 | 4.7 | 8.0 | 3.0 |
| 8 | 5.4 | 6.4 | 5.8 | 5.5 |
| 9 | 2.1 | 5.0 | 8.5 | 3.0 |
| 10 | 3.4 | 6.4 | 3.6 | 3.2 |
| 11 | 4.1 | 6.1 | 7.5 | 4.9 |
| 12 | 2.0 | 5.7 | 5.0 | 2.1 |

TABLE 21

Analysis of variance by processing factor. Only statistically significant results are presented as probability values.

| | Flavor | Texture | Appearance | Quality |
|---|---|---|---|---|
| Sugar concentration | 0.0536 | 0.0192 | 0.0005 | 0.0026 |
| Sugar type |  |  | 0.0001 | 0.0016 |
| Soak temperature | 0.0001 | 0.0033 |  | 0.0001 |
| Soak time |  |  | 0.0073 |  |
| Drying temperature |  |  |  |  |
| Salt | 0.0004 |  |  | 0.0001 |

TABLE 22

Comparison of new process onion vs patent examples.

| p > F | Trial 13 | Eq. 1, '589 | Eq. 1, '969 |
|---|---|---|---|
| Flavor 0.0001 | 7.7[a] | 4.7[b] | 1.4[c] |
| Texture 0.0001 | 7.4[a] | 5.6[b] | 3.1[c] |
| Appearance 0.0109 | 8.0[a] | 9.0[b] | 6.1[b] |
| Quality 0.0001 | 8.7[a] | 5.6[b] | 2.1[c] |
| Difference 0.0001 | 7.1[b] | 8.6[b] | 12.0[a] |

*Control: Commercially produced dehydrated onion (Gilroy Foods, Inc., Gilroy CA).

EXAMPLE 13

Onion was prepared by soaking 3000 g fresh, thinly-sliced onion in a 20% sucrose solution at 68F for 10 minutes. Excess soaking solution was removed by centrifugation and the product was dried in a Proctor and Schwartz dryer using a standard 200F step-down drying profile (Table 17, Example 12). From the same lot, onion was prepared according to Example 1, U.S. Pat. No. '589 and according to Example 1, U.S. Pat. No. '969. The dried onion samples were hydrated for 45 minutes in distilled water. The hydrated pieces were then trimmed and sliced with a razor blade to give a fragment approximately 2 mm thick, 5 mm wide and 10 mm long. The fragments were mounted on a clean glass slide with a cover slip. Several drops of fluorescein diacetate solution was added from the slide of the cover slip until the onion fragment was completely surrounded by solution. The slide was placed on a UMSP80 microspectrophotometer so the edge of the sample was visible at 10X magnification. An excitation beam of light (450–490nm) was directed through a shutter at the sample; the light emitted at 540nm from a single location on the sample was measured every 30 seconds for 30 minutes. The sample was exposed to the excitation light bee for 0.1 seconds in order to prevent loss of fluorescence intensity because of overexposure to the light source.

During the 30 minute measuring period, any esterases present in the sample will break down the colorless fluorescein diacetate into fluorescein. As the concentration of fluorescein increases, the fluorescence intensity at 540 nm increases. Therefore, samples with active esterases will show an increase in intensity over the 30 minute period.

Figure 3:
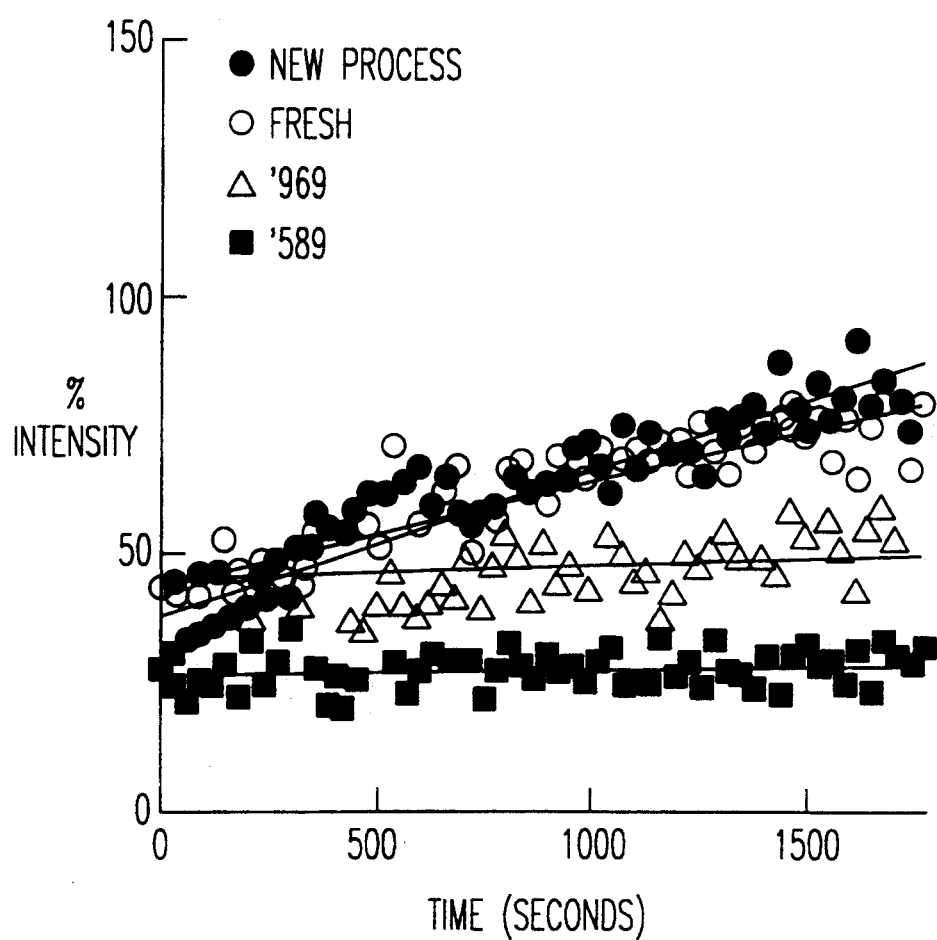
FIG. 3 compares the emission of light for the products of the present process with the fresh products which have not been preserved as compared with conventional prior art preservation techniques.

There was increased emission of light at 540 nm over time with the new process onion (FIG. 3) demonstrating that the new process onion contained active esterases which broke down fluorescein diacetate to fluorescein. Fresh onion, analyzed under identical conditions, exhibited similar esterase activity as the new process onion. Onion prepared by Example 1 of the '589 patent had no esterase activity. Onion prepared by Example 1 of the '969 patent had higher emission intensity than that of sample prepared by the '589 patent, however there was no increase in emission intensity over time indicating there was no esterase activity.

The flavor of onion is enzymatically generated; therefore it is necessary to maintain enzymnatic activity for the generation of fresh flavor. The presence of active esterases is an indication that the enzymes necessary for flavor generation in onion are still present and active upon rehydration. Sensory data indicate that onion prepared by the new process exhibits a characteristic fresh onion flavor which was not found to be present in onion prepared by either the '589 or the '969 patents.

EXAMPLE 14

Onion was prepared according to the conditions outlined in Trial #13, Table 16, Example 12 (termed "Choy"). Also onion was prepared using the conditions as described in Example 1 of U.S. Pat. No. 4,361,589 (termed "General Foods") and as described in Example 1 of U.S. Pat. No. 4,832,969 (termed "General Mills"). Air dried onion was prepared using a conventional drying profile as described in Table 17, Example 12 (termed R&D). Commercially prepared air dried onion (termed "Commercial") was obtained from Gilroy Foods, Gilroy, Calif. The samples were placed in polyethylenetetrapthalate (PET) bottles and were stored for one month at 40° F. or at 105° F. The samples were then rehydrated for 30 minutes with ambient temperature water. Excess water was removed and the samples were placed in petri dishes and photographed for comparison. The camera was a Minolta Maxxum 7000 with Macro lens using Kodak Professional Daylight film, 100 ASA. The products were photographed in a MacBeth Daylight Box 5000K.

All the rehydrated onion samples held at 40° F. look relatively similar, however when the samples were held at 105° F. there were marked differences. The "Choy", "Commercial" air dried and "General Foods" samples remained relatively white; however the "General Mills" sample and the "R&D" air dried sample turned brown and were deemed unacceptable by Sensory evaluation.

EXAMPLE 15

Green bell pepper was prepared according to the conditions outlined in Trial #6, Table 16, Example 12 (termed "Choy"). Also green bell pepper was prepared using the conditions as described in Example 1 of U.S. Pat. No. 4,361,589 (termed "General Foods"). and as described in Example 1 of U.S. Pat. No. 4,832,969 (termed "General Mills"). The samples were placed in polyethylenetetrapthalate (PET) bottles and were stored for one month at 40° F. or at 105° F. The samples were then rehydrated and photographed as described in Example 14. Temperature did not markedly affect any of the samples. The appearance of all samples were Judged acceptable by sensory evaluation.

EXAMPLE 16

Onion was prepared according to Trial 13, Example 12 (choy), also according to Example 1, U.S. Pat. No. 4,361,589 ('589 ) and according to Example 1, U.S. Pat. No. 4,832,969 ('969 ). The samples were ground in a coffee mill and 1.5 g of each was extracted with 0.3M sodium acetate in 0.1M sulfuric acid. The extracts were analyzed by high performance liquid chromatography using a C18 reversed phase column with sodium acetate as the mobile phase. The chromatogram of the choy sample exhibited two late eluting peaks which were not present extracts prepared according to example 1 of the '589 and '969 patents.

What is claimed as new and desired to be secured by Letters Patent of the United States:

1. A process for preparing a low moisture vegetable product which comprises:
    (a) immersing a vegetable slice, having a thickness not greater than 0.25 inches, in a liquid bath containing 20 to 60% by weight of a food grade osmotic agent capable of infusing into the vegetable tissue and forming an amorphous solid upon drying, wherein said infusion bath is free of added sulfites and buffer, and said vegetable has not been blanched prior to immersion in said liquid bath;
    (b) removing excess surface osmotic agent; and
    (c) drying the infused vegetable to form a vegetable product containing amorphous, solid osmotic agent and a water content from about 2 to 6 percent by weight,
    wherein said osmotic agent is selected from the group consisting of high fructose corn syrup, fructose, glucose, sucrose, maltose, honey, sorbitol, maltitol, and hydrogenated corn syrup,
    wherein said liquid bath is maintained at a temperature from about 45° F. to about 220° F., and
    wherein said vegetable is selected from the group consisting of green bell peppers and onions.

2. The process of claim 1 wherein said liquid bath comprises a food grade solvent and the food grade solvent is water.

3. The process of claim 1 wherein the osmotic agent is a corn syrup having a D.E. above about 42, glucose, fructose, sucrose, honey or mixtures thereof.

4. The process of claim 1 wherein the liquid bath is maintained at a temperature of from about 140° F. to 220° F.

5. The process of claim 1 wherein the liquid bath is maintained at a temperature of from 45° F. to 160° F.

6. The process of claim 1 wherein the vegetable is immersed in a liquid bath for a time from about 20 seconds to about 2 hours.

7. The process of claim 1 wherein the vegetables are washed prior to immersion in the liquid.

8. The process of claim 7 where after washing the vegetable, the vegetable is dewatered by centrifuging.

9. The process of claim 1, wherein said vegetable slice has a thickness of 1/16 to 3/16 inches.

10. The process of claim 1, wherein said vegetable is green bell peppers.

11. The process of claim 1, wherein said vegetable is onions.

* * * * *